United States Patent [19]
Young et al.

[11] Patent Number: 5,532,754
[45] Date of Patent: Jul. 2, 1996

[54] BACKGROUND TELEVISION SCHEDULE SYSTEM

[75] Inventors: Patrick Young, San Mateo; John H. Roop, Palo Alto; Michael W. Faber, Pleasanton, all of Calif.

[73] Assignee: Starsight Telecast Inc., Fremont, Calif.

[21] Appl. No.: 226,209

[22] Filed: Apr. 11, 1994

Related U.S. Application Data

[63] Continuation of Ser. No. 33,773, Mar. 19, 1993, Pat. No. 5,353,121, which is a continuation-in-part of Ser. No. 579,555, Sep. 10, 1990, abandoned, and a continuation-in-part of Ser. No. 916,043, Jul. 17, 1992, abandoned, which is a continuation of Ser. No. 778,404, Oct. 17, 1991, Pat. No. 5,151,789, which is a continuation-in-part of Ser. No. 428,620, Oct. 30, 1989, abandoned.

[51] Int. Cl.$^6$ ........................................................ H04N 5/44
[52] U.S. Cl. .......................... 348/569; 348/563; 348/734; 348/906; 455/185.1
[58] Field of Search ..................................... 348/569, 570, 348/734, 906, 6, 12, 13, 563; 358/335; 455/185.1, 186.1, 168; H04N 5/44

[56] References Cited

U.S. PATENT DOCUMENTS

| | | | |
|---|---|---|---|
| 4,488,179 | 12/1984 | Krüger et al. | 358/181 |
| 4,527,194 | 7/1985 | Sirazi | 358/86 |
| 4,706,121 | 11/1987 | Young | 358/142 |
| 4,737,993 | 4/1988 | De Vilbiss | 455/180 |
| 4,802,114 | 1/1989 | Sogame | 364/900 |
| 4,807,052 | 2/1989 | Amano | 358/194.1 |
| 4,841,368 | 6/1989 | Rumbolt et al. | 358/194.1 |
| 4,908,713 | 3/1990 | Levine | 358/335 |
| 5,047,867 | 9/1991 | Strubbe et al. | 358/335 |
| 5,151,789 | 9/1992 | Young | 358/194.1 |
| 5,323,234 | 6/1994 | Kawasaki | 348/6 |
| 5,390,027 | 2/1995 | Henmi et al. | 358/335 |

Primary Examiner—Victor R. Kostak
Assistant Examiner—Glenton B. Burgess
Attorney, Agent, or Firm—Townsend and Townsend and Crew

[57] ABSTRACT

Screen (10) for a user interface of a television schedule system and process consists of an array (24) of irregular cells (26), which vary in length, corresponding to different television program lengths of one half hour to one-and-one half hours or more. The array is arranged as three columns (28) of one-half hour in duration, and twelve rows (30) of program listings. Some of the program listings overlap two or more of the columns (28) because of their length. Because of the widely varying length of the cells (26), if a conventional cursor used to select a cell location were to simply step from one cell to another, the result would be abrupt changes in the screen (10) as the cursor moved from a cell (26) of several hours length to an adjacent cell in the same row. An effective way of timing the motion is to assume that behind every array (24) is an underlying array of regular cells. By restricting cursor movements to the regular cells, abrupt screen changes will be avoided. With the cursor (32), the entire cell (26) is 3-D highlighted, using a conventional offset shadow (34). The offset shadow (34) is a black bar that underlines the entire cell and wraps around the right edge of the cell. A background mode for the television program guide presents several lines of guide information overlying a portion of the current television program.

7 Claims, 26 Drawing Sheets

FIG. 1.

| CH 2 | KNTV-FOX | CBL 2 | 11:25A | TUE APR 3 |
|------|----------|-------|--------|-----------|
| | 11:00 AM | 11:30 AM | 12:00 PM | |
| 2 | JUDGE (PART 1) | JUDGE (PART 2) | AT NOON | |
| 4 | GOLDEN GIRLS | NEWS 26 | INSIDE EDITION | |
| 5 | YOUNG & RESTLESS | | NEWS 26 | |
| 7 | PERFECT STRA | LOVING | ALL MY CHILD | |
| 9 | SESAME STREET 26 | | | |
| 13 | ALL MY CHILDREN | | NEWS | |
| 44 | EVERYDAY 26 | | MOVIE | |
| A&E | LORNE GREEN'S WORLD OF S | | FUGITIVE | |
| CNN | NEWS | | NEWS 38 | |
| DIS | WALT DISNEY PRESENTS | | LUNCH BOX | |
| LIF | JANE WALLACE | | FRUGAL GOURM | |
| TNT | MOVIE 26 | | | |

| CH 2 | KNTV-FOX | CBL 2 | 11:25A | TUE APR 3 |

| | 11:00 AM | 11:30 AM | 12:00 PM |
|---|---|---|---|
| 2 | JUDGE(PART 1) | JUDGE(PART 2) | AT NOON |
| 4 | GOLDEN GIRLS | NEWS | INSIDE EDITION |
| 5 | YOUNG & RESTLESS 26 | | NEWS 26 |
| 7 | PERFECT STRA | LOVING | ALL MY CHILD |
| 9 | SESAME STREET 26 | | |
| 13 | ALL MY CHILDREN | | NEWS |
| 44 | EVERYDAY 26 | | MOVIE |
| A&E | LORNE GREEN'S WORLD OF S | | FUGITIVE |
| CNN | NEWS | | NEWS |
| DIS | WALT DISNEY PRESENTS | | LUNCH BOX |
| LIF | JANE WALLACE | | FRUGAL GOURM |
| TNT | MOVIE 26 | | |

FIG. 2.

| CH 2 | 11:00 AM | 11:30 AM | 12:00 PM |
|---|---|---|---|
| 2 | JUDGE (PART 1) | JUDGE (PART 2) | AT NOON |
| 4 | GOLDEN GIRLS | NEWS 26 | INSIDE EDITION |
| 5 | YOUNG & RESTLESS | | NEWS 26 |
| 7 | PERFECT STRA | LOVING | ALL MY CHILD |
| 9 | SESAME STREET | | |
| 13 | ALL MY CHILDREN | | NEWS 26 |
| 44 | EVERYDAY 26 | | MOVIE |
| A&E | LORNE GREEN'S WORLD OF S | | FUGITIVE |
| CNN | NEWS | | NEWS |
| DIS | WALT DISNEY PRESENTS | | LUNCH BOX |
| LIF | JANE WALLACE | | FRUGAL GOURM |
| TNT | MOVIE 26 | | |
| | KNTV-FOX | CBL 2 | |

FIG. 3.

| | 11:00 AM | 11:30 AM | 12:00 PM |
|---|---|---|---|
| 2 | JUDGE(PART 1) | JUDGE(PART 2) | AT NOON |
| 4 | GOLDEN GIRLS | NEWS 26 | INSIDE EDITION |
| 5 | YOUNG & RESTLESS | | NEWS 26 |
| 7 | PERFECT STRA | LOVING | ALL MY CHILD |
| 9 | SESAME STREET 26 | | NEWS 26 |
| 13 | ALL MY CHILDREN | | MOVIE |
| 44 | EVERYDAY | | FUGITIVE |
| A&E | LORNE GREEN'S WORLD OF S | | NEWS |
| CNN | NEWS 26 | | LUNCH BOX |
| DIS | WALT DISNEY PRESENTS | | FRUGAL GOURM |
| LIF | JANE WALLACE | | |
| TNT | MOVIE 26 | | |

| CH 2 | KNTV–FOX | CBL 2 | 11:25A | TUE APR 3 |

FIG. 5.

| CH | 2 | KNTV-FOX | CBL 2 | 11:25A | TUE APR 3 |
|---|---|---|---|---|---|
| | | 11:00 AM | 11:30 AM | 12:00 PM | |
| 2 | | JUDGE(PART 1) | JUDGE(PART 2) | AT NOON | |
| 4 | | GOLDEN GIRLS | NEWS 26 | INSIDE EDITION | |
| 5 | | YOUNG & RESTLESS | | NEWS 26 | |
| 7 | | PERFECT STRA | LOVING | ALL MY CHILD | |
| 9 | | SESAME STREET 26 | | | |
| 13 | | ALL MY CHILDREN | | NEWS 26 | |
| 44 | | EVERYDAY 26 | | MOVIE | |
| A&E | | LORNE GREEN'S WORLD OF S | | FUGITIVE | |
| CNN | | NEWS | | NEWS | |
| DIS | | DOROTHY BRINGS SOPHIA'S SISTER (NANCY WALKER) OVER FROM SICILY AS A BIRTHDAY SURPRISE | | | |
| LIF | | | | | |
| TNT | | | | | |

FIG. 6.

WHAT'S NEXT ON CHANNEL 2

11:00 A JUDGE (PART 1)
11:30 A JUDGE (PART 2)
12:00 P AT NOON
1:00 P MOVIE: ANATOMY OF A SEDUCTION
3:00 P ALVIN AND THE CHIPMUNKS
3:30 P SUPER MARIO BROS. SUPER SHOW
4:00 P CHIP'N DALES RESCUE RANGERS
4:30 P DUCKTALES
5:00 P SILVER SPOONS
5:30 P THREE'S COMPANY
6:00 P WHO'S THE BOSS
6:30 P MAMA'S FAMILY
7:00 P CHEERS

| CH 2 | KNTV-FOX | CBL 2 | 11:25A | TUE APR 3 |

| MY | | CHANNEL CUSTOMIZATION | | PAGE 1 | |
|---|---|---|---|---|---|
| 2 | 2 | KTVU–2 | 14 WGN | 26 | CSPAN |
| 4 | 3 | KICU–36 | 15 PPVW | 27 | MAX |
| 5 | 4 | KRON–4 | 16 KVOF–38 | 28 | CSPAN |
| 7 | 5 | KPIX–5 | 17 WTBS | 29 | EDUC |
| 9 | 6 | KSTS–48 | 18 KCSM–60 | 30 | DIS |
| 20 | 7 | KGO –7 | 19 KTSF–26 | 31 | VH–1 |
| 44 | 8 | KTEH–54 | 20 KOFY–20 | 32 | SHO |
| HBO | 9 | KQED–9 | 21 TRVL | 33 | CNN |
| SHO | 10 | KDTV–14 | 22 CBN | 34 | ESPN |
| CNN | 11 | KNTV–11 | 23 CBB | 35 | LIF |
| DIS | 12 | KBHK–44 | 24 BDSS | 36 | HBO |
| ESPN | 13 | KQEC–32 | 25 BARC | 37 | GALA |
| USE SELECT TO CHANGE STATUS: | | | | MY OFF | ON |

BACKGROUND TELEVISION SCHEDULE SYSTEM

CROSS REFERENCE TO RELATED APPLICATIONS

This is a continuation of U.S. Ser. No. 08/033,773, filed Mar. 19, 1993, Now U.S. Pat. No. 5,353,121, which is a continuation-in-part both of U.S. Ser. No. 07/579,555, filed Sep. 10, 1990, abandoned, which is herein incorporated by reference in its entirety, and of U.S. Ser. No. 07/916,043, filed Jul. 17, 1992, abandoned, which is herein incorporated by reference in its entirety and which is a continuation of U.S. Ser. No. 07/778,404, U.S. Pat. No. 5,151,789, filed Oct. 17, 1991, which is herein incorporated by reference in its entirety and which is a continuation-in-part of U.S. Ser. No. 07/428,620, filed Oct. 30, 1989, now abandoned, which is herein incorporated by reference in its entirety.

BACKGROUND OF THE INVENTION

One aspect of the present invention relates generally to a system and process that allows a television viewer to access on screen television program listings and use the program listings in an easy and convenient way to control operation of a video cassette recorder (VCR) or other recording device. In particular, it relates to a system and process that displays on a television screen, overlaying a primary television display or program, a small background schedule guide that can be easily accessed by a user during lulls in the primary television display or program.

Another aspect of the present invention relates to such a system and process that creates a directory of recorded programs by title for easy retrieval and program playback. More particularly, it relates to such a system and process in which the VCR or other recording device is controlled by a simple selection of program title and a record command, even for recording at a future date and time. Most especially, it relates to such a system and process incorporating an intuitive user interface.

Yet another aspect of the present invention relates generally to a cable television (CATV) decoder interface. More particularly, it relates to such an interface for connecting the cable television decoder to a television accessory, such as a video cassette recorder (VCR). Most especially, it relates to such an interface which maintains full functionality of the television accessory while connected to the decoder.

The difficulty of setting a VCR for automatic recording at a future date is notorious. Even users who are technically sophisticated will often make mistakes in the VCR programming procedure that cause them to record the wrong program or not to record anything at all. This difficulty has even resulted in a substantial body of humor dedicated to the subject of programming VCRs.

The difficulty of VCR programming has been alleviated somewhat by the development of VCRs that use a television set as a display for user prompts and feedback to the user during the programming process. U.S. Pat. No. 4,908,713, issued Mar. 13, 1990 to Michael R. Levine, discloses such a VCR using the television set as a display for VCR programming with an interactive user interface for directing the user on a step-by-step basis. Such a user interface removes a great deal of the mystery from VCR programming, but users still have difficulty with such a command-based interface and encounter problems carrying out the programming without making mistakes that cause them to miss recording programs they would like to watch at a different time than when they are broadcast.

Commonly assigned U.S. Pat. No. 4,706,121, issued Nov. 10, 1987 to Patrick Young, discloses a system and process in which user selections from television schedule information are used for automatic control of a VCR. That patent also contains a description of a proposed user interface for such a system and process. However, the provision of a highly intuitive user interface that makes such a system and process easy and convenient to operate is a difficult task. Further development of this system and process has produced considerable change in the user interface as originally proposed.

In addition to simplifying VCR programming, users who do a substantial amount of program taping also need an improved system and process for keeping track of their recorded programs. Commonly assigned application Ser. No. 07/219,971, filed Jul. 15, 1988, in the name of Patrick Young, discloses a system and process that provides indexing capability for taped material. A user interface for a television schedule system and process should also handle this capability on an intuitive basis.

Thus, while the art pertaining to the control of VCRs and to television schedule systems is a well-developed one, a need still remains for a television schedule system and process incorporating an improved user interface. In particular, unlike most computer menus, a grid TV guide is an array of irregular cells, where the cell size can vary from a fraction of an hour to many hours-extending well beyond the current screen. If this array is navigated by a cursor that goes from cell to cell, a single cursor command can produce violent screen changes. For example, a cursor right command may cause an abrupt jump to a cell situated several hours from the current page. Not only is this unsettling, but may take considerable effort to recover. Clearly, a gentler cursor motion is needed for the irregular cells found in a grid TV guide.

Printed grid television schedule guides often include additional information besides the program title and broadcast names. Such grids are also-typically provided in combination with a more detailed printed schedule that contains a synopsis of each program, whether the program is a repeat, ratings for movies, and other information. When using a television set as a display for a schedule system, the size and resolution of the television display limit the amount of text that can be displayed with the grid. Improved techniques are required for conveying the most amount of information to the user in an easily understood manner within the limitations of the television display. When a large number of channels are available for viewing, there is also a need to order the display of information most conveniently for the user.

Programming a VCR for unattended recording becomes even more problematic when it is desired to record cable programs. Cable television decoders typically operate by requiring a television set and a VCR connected to the decoder to be set to a predetermined channel, such as channel 2, 3 or 4, and all channel selection is accomplished by the decoder. This presents problems for unattended recording, in that not all of the advanced features available on state-of-the-art VCRs can be used while the VCR is under control of the decoder.

Two Zenith Electronics Corporation technical papers disclose systems which attempt to deal with this problem. Merrell, "Tac-Timer," 1986 NCTA Technical Papers, pp. 203–206, discloses a smart remote controller to solve the unattended programming problem when a cable decoder precedes a VCR. The smart controller is programmed to turn on the cable decoder at specific times, but the VCR must be programmed independently to match the programming of the smart controller. However, this remote controller does not coordinate channel selection for such devices as television schedule systems, such as disclosed in my U.S. Pat. No. 4,706,121, issued Nov. 10, 1987, nor does it support unique features of more advanced VCRs. For example, this controller does not support on-screen VCR programming, even if that feature is otherwise available on a VCR. The controller does not include any capability for conveying information about a channel selected on the cable decoder unit to a television schedule system or a VCR in any useful way.

Long, "The VCR Interface," 1986 NCTA Technical Papers, pp. 197–202, discloses two solutions for the unattended programming problem when a cable decoder precedes a VCR. The first of these is a VCR baseband decoder, also called BASE-TAC, and currently marketed by Zenith as MultiPort or MP. MPs allow the core functions (descrambling and addressing) of a cable decoder to be added to TVs and VCRs. The decoder accepts the baseband output of the TV or VCR tuner, eliminating the need for a separate decoder tuner and attendant need to coordinate two tuners. This method is effective for supporting television schedule systems and allows full functionality of advanced VCR features. However, the MP alternative requires new TV or VCR equipment and is not compatible with the existing installed base of cable decoders. This method has not been well-received at this time. The second is the VCR Interface, which uses RF switching and a centralized approach for all TVs and VCRs in the home. It descrambles incoming CATV channels and, after modulation, combines them back onto the CATV cable at unused upper channels. The result is that any TV set on the cable can receive premium channels without a separate decoder. This method eliminates the need for redundant decoders at every TV set or VCR. As described, the system was conceived for only one premium channel. To support a television schedule system, all premium channels must be descrambled together and be available simultaneously. If not, it would be necessary to provide a way of tuning the centralized descrambler from any TV set or VCR attached to the cable. Such a scheme would be awkward when more than one TV or VCR competes for control of the single descrambler. The VCR interface may be implemented using retrofitted decoders, but the overall cost may be prohibitive for the average home.

A somewhat similar system for use with the German television networks is described in Sommerhauser, "Video Programm System: Flexibel programmieren mit VPS," Funkschau, No. 25, December 1985, pp. 47–51.

Other prior art relating to CATV, its decoders, and programmable remote devices includes west German Published Application 2,338,380, published Feb. 13, 1975; U.K. Patent 1,554,411, published Oct. 17, 1979; U.S. Pat. No. 4,375,651, issued Mar. 1, 1983 to Templin et al.; U.S. Pat. No. 4,394,691, issued Jul. 19, 1983 to Amano et al; U.S. Pat. No. 4,802,114, issued Jan. 31, 1989 to Sogame. While the prior art relating to cable decoder interfaces and similar devices is a well-developed one, a need remains for further development of such devices. None of the existing interfaces both provides a complete solution to the problem of unattended recording and is compatible with already installed equipment.

SUMMARY OF THE INVENTION

The above problems and difficulties present in the prior art are overcome through the use of the novel system and method of the present invention. One aspect of the present invention is directed to a system and method to allow automatic, unattended recording of cable television programs supplied on a cable system as herein disclosed. A video recording system to allow automatic, unattended recording of at least two cable television programs supplied sequentially at different times on different channels of a cable system includes a television receiver, a remote controllable cable decoder and a remote controllable video recorder with unattended programming capability connected between the television receiver and the cable decoder. A remote controller for the video recorder includes a means for user input of program selections from a television schedule. The remote controller is coupled to the video recorder. A channel selection coordinator includes a memory means for storing channel tuning conversion information and program selections input by the user with the means for user input of program selections. A means converts channels of the at least two program selections to channel tuning commands recognizable by the cable decoder using the channel tuning conversion information and the program selections. A means automatically transmits the channel tuning commands to the cable decoder at desired activation times of the at least two program selections (typically the broadcast times, with a guard time at the beginning and end of each program). A means automatically supplies recording commands to the video recorder at the desired activation times of the at least two program selections.

The method of this aspect of the invention automatically records cable television programs supplied sequentially at different times on a cable system unattended, even with channel changes between the programs. A remote controllable video recorder having unattended programming capability is connected between a television receiver and a remote controllable cable decoder. Channel tuning conversion information is stored in a memory. Program selections for at least two programs on different channels is input from a television schedule with a remote controller for the video recorder. The program selections are stored in the memory. Channels of the program selections are converted to channel tuning commands recognizable by the cable decoder using the channel tuning conversion information and the program selections. The channel tuning commands are automatically transmitted to the cable decoder at broadcast times of the program selections. Recording commands are automatically transmitted to the video recorder at the broadcast times of the program selections.

Another aspect of the present invention is directed to a novel television schedule system and process user interface herein disclosed. A television schedule system including a user interface in accordance with this aspect of the invention has a display and a means connected to the display for displaying the television schedule on the display as an array of irregular cells which vary dimensionally in length, corresponding to different television program time lengths. A means is connected to the display for providing a cursor with the television schedule on the display. The cursor has a variable length corresponding to the length of a selected one of the irregular cells in which the cursor is located. A means is connected to the means for providing the cursor for moving the cursor in the array in a series of equal length steps. At least some of the irregular cells have a length which is greater than the length of the steps.

In the process of operating a television schedule system with the user interface of this aspect of the invention, the television schedule is displayed as an array of irregular cells which vary dimensionally in length, corresponding to different television program time lengths. A cursor is provided with the television schedule on the display, the cursor has a variable length corresponding to the length of a selected one of the irregular cells in which the cursor is located. The cursor is moved in the array in a series of equal length steps, with at least some of the irregular cells having a length which is greater than the length of the steps.

In another aspect of the invention, a control system for a video recording machine has a controller for starting and stopping the video recording machine, for recording video information on recording media, and for playing recorded video information on recording media. A display generator provides display image generation signals. A means supplies information to the display generator for generation of display images relating to operation of the video recording machine. The means for supplying information includes means for generating a recording media position indicator graduated as segments corresponding to programs recorded on the recording media.

In a process for controlling a video recording machine according to this aspect of the invention, a recording media position indicator is graduated as segments corresponding to programs recorded on the recording media. The recording media position indicator is displayed as position of a selected one of the recording media in the video recording machine is changed.

In a further aspect of the invention, a television schedule system includes a display and means connected to the display for displaying the television schedule on the display. The means for displaying a schedule is configured to allow selection by a user of a first number of desired channels for display of schedule information which is less than a second number of available channels. A programmable tuner is connected to the means for displaying a schedule. The programmable tuner is configured to follow the first number of desired channels when the television schedule is shown on the display in response to a channel up or channel down command. The programmable tuner is configured to follow the second number of available channels in the absence of the television schedule on the display in response to a channel up or channel down command.

In a process for operating a television schedule system according to this further aspect of the invention, a first number of desired channels is selected for display of schedule information, which is less than a second number of available channels. The schedule information is displayed on a display. The first number of desired channels is followed when the schedule information is shown on the display in response to a channel up or channel down command. The second number of available channels is followed in the absence of the television schedule on the display in response to a channel up or channel down command.

According to yet another aspect of the present invention, user control of a television is simplified by a system and process that displays on a television screen, overlaying a primary television display or program, a small background schedule guide that can be easily accessed by a user during lulls in the primary television display or program.

The attainment of the foregoing and related objects, advantages and features of the invention should be more readily apparent to those skilled in the art, after review of the following more detailed description of the invention, taken together with the drawings.

BRIEF DESCRIPTION OF THE DRAWINGS

FIGS. 1–3 are diagrammatic representations of a television schedule grid incorporating the user interface for the system and process of this invention.

FIGS. 5–7 are additional diagrammatic representations of the television schedule grid incorporating the user interface for the system and process of the invention.

FIG. 20 is a diagrammatic representation of a channel customization screen display of the user interface for the system and process of the invention.

DETAILED DESCRIPTION OF THE INVENTION

I. User Interface

Figure 4:
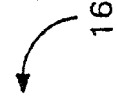
FIG. 4 is a diagrammatic representation of a screen display used in the system and process of the invention.

Turning now to the drawings, more particularly to FIGS. 1–7, there are shown a series of menu screens 10, 12, 14, 16, 18, 20 and 22 used in operation of the system and carrying out the process of the invention. Screens 10, 12, 14, 18 and 20 each consists of an array 24 of irregular cells 26, which vary in length, corresponding to different television program lengths of one half hour to one-and-one half hours or more. The array is arranged as three columns 28 of one-half hour in duration, and twelve rows 30 of program listings. Some of the program listings overlap two or more of the columns 28 because of their length. Because of the widely varying length of the cells 26, if a conventional cursor used to select a cell location were to simply step from one cell to another, the result would be abrupt changes in the screens 10, 12, 14, 18 and 20 as the cursor moved from a cell 26 of several hours length to an adjacent cell in the same row. Such abrupt changes disorient a user of the system.

An effective way of taming the motion is to assume that behind every array 24 is an underlying array of regular cells. By restricting cursor movements to the regular cells, abrupt screen changes will be avoided. However, there is now a potential ambiguity between the underlying cell which governs cursor movement and a visible cell 26 which holds the program title.

Viz.: if the cursor moves in half hour steps, and the cell length is, say four hours, should the cursor be ½ hour long or four hours long? If the cursor only spans the interval of the underlying cell (½ hour), the cursor appears to be highlighting a segment of the cell, which is misleading. On the other hand, if the cursor spans the entire four hours of the TV listing, the cursor underlying position will be obscure. In this case, cursor right/left commands will appear inoperative while traversing a long cell. The absence of feedback following a cursor command is befuddling to users. Therefore, an innovative cursor 32 (FIG. 1) for the irregular array 24 is required which satisfies several conflicting requirements.

With the cursor 32, the entire cell 26 is 3-D highlighted, using a conventional offset shadow 34. The offset shadow 34 is a black bar that underlines the entire cell and wraps around the right edge of the cell. To tag the underlying position—which defines where the cursor 32 is and thus, where it will move next—portions 36 of the black bar outside the current underlying position are segmented, while the current position is painted solid.

For an half hour cell 26, the offset shadow's underline bar will always be solid black. FIGS. 2 and 3 show the cursor 32 as it appears for a half-hour program. For programs that go beyond ½ hour, only the current ½ hour position will be solid black. All remaining positions will be stripped. If the cursor is moved left or right, the solid section will move accordingly, providing complete visual feedback. Thus, this modified 3D offset shadow cursor 32 satisfies the demands stated above: it spans the entire cell, yet clearly highlights the current underlying position. Movement of the cursor 32 will always be visible even for cells 26 that are much longer than the underlying cell.

A grid continuity icon 38 is shown in FIG. 1. Printed grid television schedule guides often include parenthetical comments, (such as "cont'd") to indicate program continuity. In an electronic guide displayed on a TV screen, limited text space precludes parenthetical comments. To conserve space, an icon 38 will be used to indicate cell 26 continuity. At the border of a cell 26 that is continued to the next screen, an arrow icon 38 pointing to the right will be overlaid. The arrow direction always points to right, which is the direction of program elapse.

FIGS. 2 and 3 show recording status representations. When a program has been selected for recording, its listing cell 26 will be outlined or highlighted in red, as indicated at 40. If guard time has been added or deleted, the cell will be stretched or shrunk to reflect the change. Cell 26 continuity will be treated the same as above. There are four other record status representations:

If the cell is actively being recorded, the outline 40 will blink off and on.

A recorded cell will be displayed with a solid red background 42 (Note: Not shown in drawing).

A mis-recorded cell will be indicated by red hash-marks 44 over the title. A mis-recording can be the result of insufficient tape, VCR loss of power, stopped before completion, etc.

Figure 23:
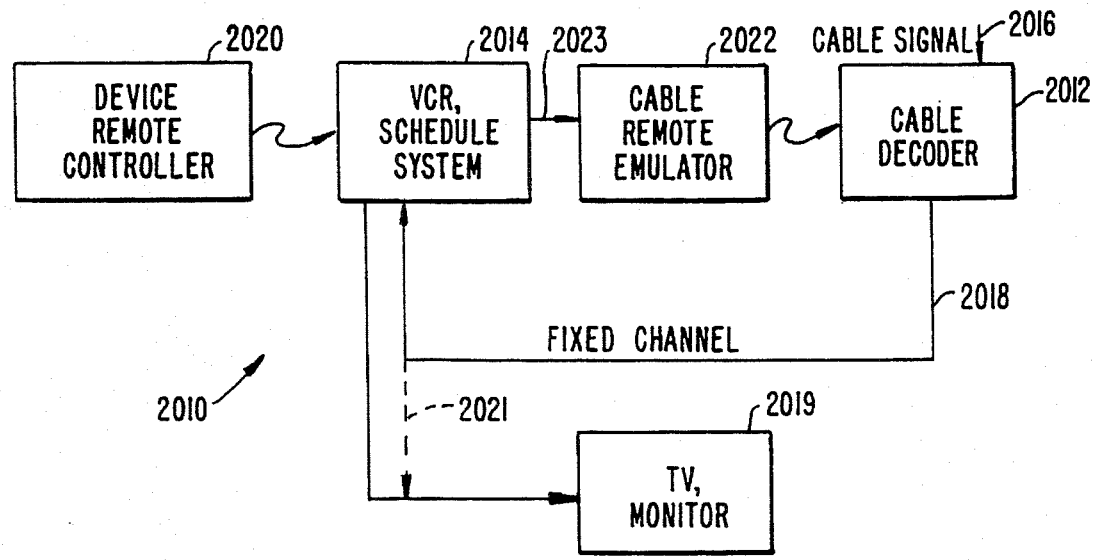
FIG. 23 is a block diagram of a system for interfacing a cable television decoder to a television accessory in accordance with one aspect of the invention.

A program linking icon 46 is shown in FIG. 5. After each schedule update, the schedule system examines the new listings for the occurrence of any titles that match a title in Linked Titles (FIG. 23). If a title matches, it will automatically be tagged for recording. When a linked program is displayed in the guide, it will have two identifiers: a red outline 40 indicating that the title has been selected for recording, and a link icon 46 appended to the title to indicate that this title was link-selected. After a linked program has been recorded, it will be treated like any recorded program with the title shaded in red. To differentiate this recording from others, the link icon will remain appended to the title.

Further details on the linking feature are given in screen 19 of FIG. 23. 1) A linked program 47 may be suspended by the user (perhaps to avoid conflict with a pending recording), by de-selecting the link title in the Link List screen, under the Record Memo command. A suspended link program will still be identified by a link icon, but the red-outline will be suppressed since the program will not be recorded. 2) A smart link process is used to tame the matching of titles when there is a likelihood of excessive candidates for recording. The Lucy show, for example, is often syndicated on several channels, each running a different vintage series of Lucy. Untamed linking may result in a plethora of recording, mixing segments from one vintage with segments from another vintage. To differentiate vintages of a series, each Lucy vintage can be given a distinct title. For example, one may be entitled "The Lucy Hour" while another may be "The Lucy Show" etc. However, due to syndication right overlaps, it is possible for two or more television or cable TV stations to carry the same vintage of a series, but still be running different segments of the same vintage. For such series, the link list will include the channel and time as well as the link title. For the avid Lucy-phile, the user can locate each series individually for linking. If there is more than one link title of the same name, the series will be numbered, in the order of acquisition, Thus, the second Lucy will be identified as Lucy (Two), at 47.

FIGS. 1-3 show the columns 28 headed by half-hour header status indicators. The ½ hour header strip across the top of the grid TV guide has two auxiliary functions: 1) as an indicator 48 of pending or in-progress recording scheduled at that time, and 2) as a time-bar 50 to delineate the past from the future. The past is darkened, while the future is lightly shaded. If there is an in-progress recording, the ½ hour header will be red-outlined at 48 in the same manner as a pending recording title cell 26.

FIG. 6 shows a television schedule grid screen 20 with a program note overlay 52. With limited text capacity on TV displays, it is preferable to display as many lines of TV listings as feasible. To handle program notes, which are text intensive, on-demand overlays 52 are used. Program note overlays 52 may include any or all of the following information:

A program genre

Program description

Stars and personalities

Year of release

Episodic subtitles

Run-time of program

Elapse time of the program

Critique (Star Ratings)

Rating (PG, G, etc.)

Call letter, channel markers

Closed caption, stereo.

Pay Per View Program

Program notes for a selected program are overlaid over the grid guide upon request. The program note can be toggled off/on using a SELECT command. The program note 52 overlays and hides 3 or 4 listings of a guide. To minimize concealment of the guide, an auto-roving note is used. The program note will overlay either the top half or bottom half of the screen, as necessary to avoid masking the title of the selected listing. If the cursor 32 is in the upper half of the screen, the note will appear in the bottom half, and vice versa. If the cursor 32 is moved to the lower half of the screen, the note will automatically position itself in the upper half of the screen.

FIGS. 1–3 and 5–6 show a channel column 54 in the television schedule grid 24. Favorite stations and cable channels may be listed together to create a personalized grid guide. The channel column 54, unlike most printed TV guides, has a mix of over-the-air station names and cable services names.

The grid 24 guide lists channels by favorite combinations of station number and cable names, and not in the usual numerical order. Note that the order of channels can be arranged in any sequence, and need not be the numeric grouping followed by alphabetical grouping, as shown in the figures. For example, the first channel of column 54 may be DIS, followed next by channel 44, next by A&E, next channel 4, etc. The method of rearranging the channels is described in detail below. When viewing the grid 24 guide, a Tuner Up/Down channel command will be mapped according to the channels and order listed on the screen. When not viewing the guide, the tuner sequence will revert back to the usual numerical order. When the last channel on a page is reached, the next Tuner command will change the channel to the channel listed at the beginning of the following page.

When a channel to which the tuner is tuned is displayed on the grid 24, it is highlighted, as shown at 56. A grid 24 page may be changed by either a page command or by entering a channel Up/Dn command as described above. If a page is turned using the page command, the current channel is now located in the previous page, and will not be seen in the new page. Therefore, the new page must suppress the highlighting of a channel, since that indicates the current channel. Note that information about the current channel will still be presented in the channel information boxes 58 at the bottom of the screen.

When is the highlighting re-enabled? Once into the new page, the first channel up/down command will cause the tuner to automatically change to the channel listed in the last or first row 30 respectively of the new page. Since the tuner channel is now located on the new page, the current channel will be highlighted again.

If the channel highlighting is not suppressed after a page is selected, by definition, the tuner must be changed to track the highlighted channel. This is undesirable since casual paging should not cause the channel to change.

When a guide is first opened, as shown in FIG. 2, both the cursor 32 and the current channel 56 are situated on the same row 30 of the grid 24. When the channel 56 is changed, it is desirable to drag the cursor 32 along with the channel in unison. In doing so, the cursor 32 will be ready for a Select command (to retrieve the program note) or for a Record It command. Cursor dragging by the channel command takes place whenever the channel 56 and cursor 32 are united on the same row. If they are not united, the cursor 32 is disengaged from the channel command. Note that dragging is not reciprocal; moving the cursor 32 does not affect channel selection.

FIG. 7 shows a screen 22, showing a program list 58 for a single channel, generated by toggling a user What's On TV command, which switches between the grid 24 and the list 58. The list 58 consists of rows 60 of sequential program listings on the channel and a channel information field 62. Program notes are overlaid on the list 58 in the same manner as shown in FIG. 6 for the grid 24.

Figure 8:
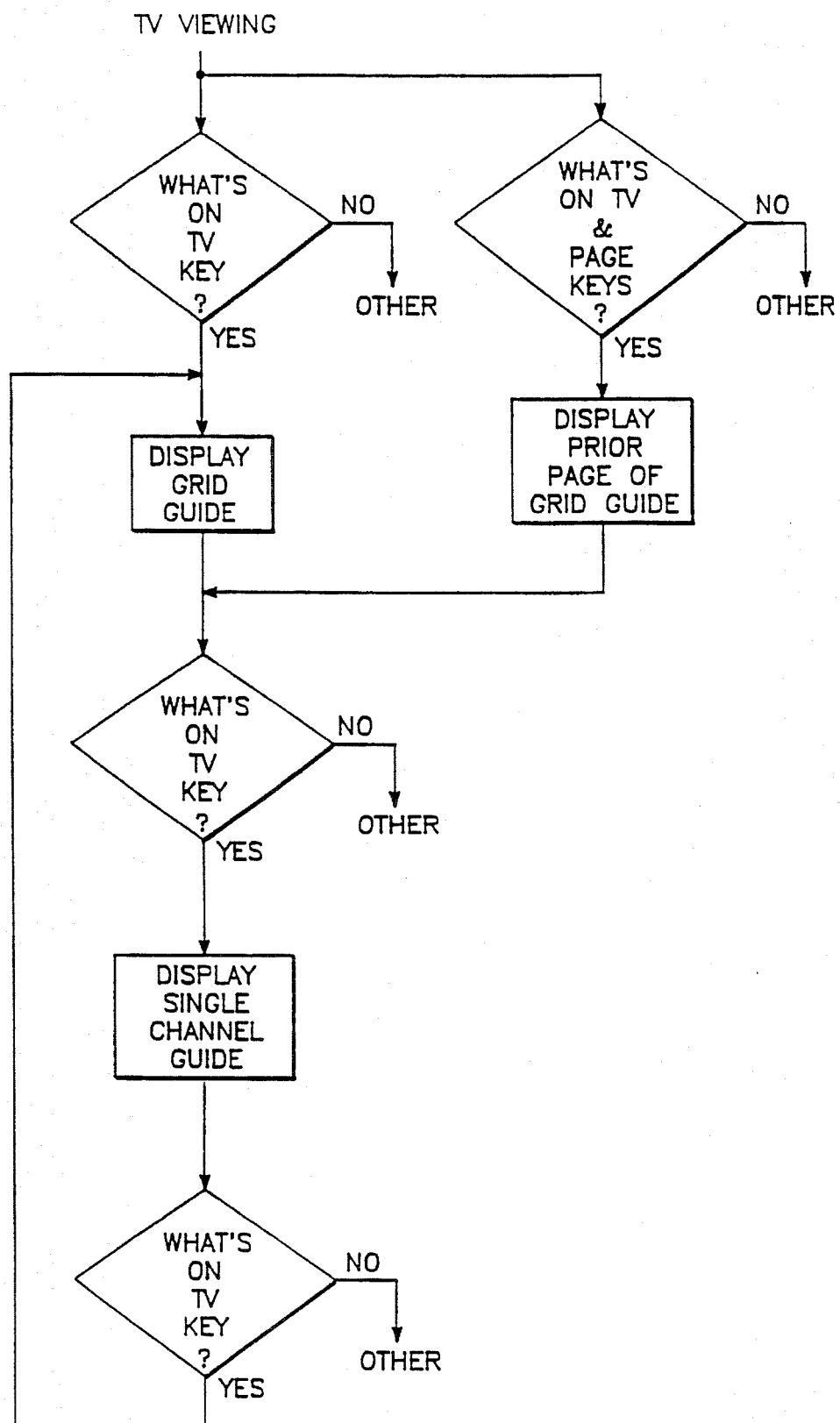
FIG. 8 is a flow chart for understanding the operation of the FIG. 7 diagram.

Each What's On TV command alternates between the grid guide 24 and the What's Next on Channel row guide 58. While viewing the grid guide 24, the next What's On TV command will replace the grid guide 24 with a single-channel row guide 58. FIG. 8 is the flow diagram for the What's On TV command.

The page relationship between the two guides 24 and 58 are tightly coupled. The single channel guide will open to the channel and schedule time that was selected by the cursor 32 on the grid 24. While viewing the single channel guide 58, the Up/Down channel command may be used to change the channel to be listed. When exiting the single channel guide 58 and returning to the grid guide 24, the grid cursor 32 will be pointed to the channel and schedule time last selected on the single channel guide 58.

Figure 9:
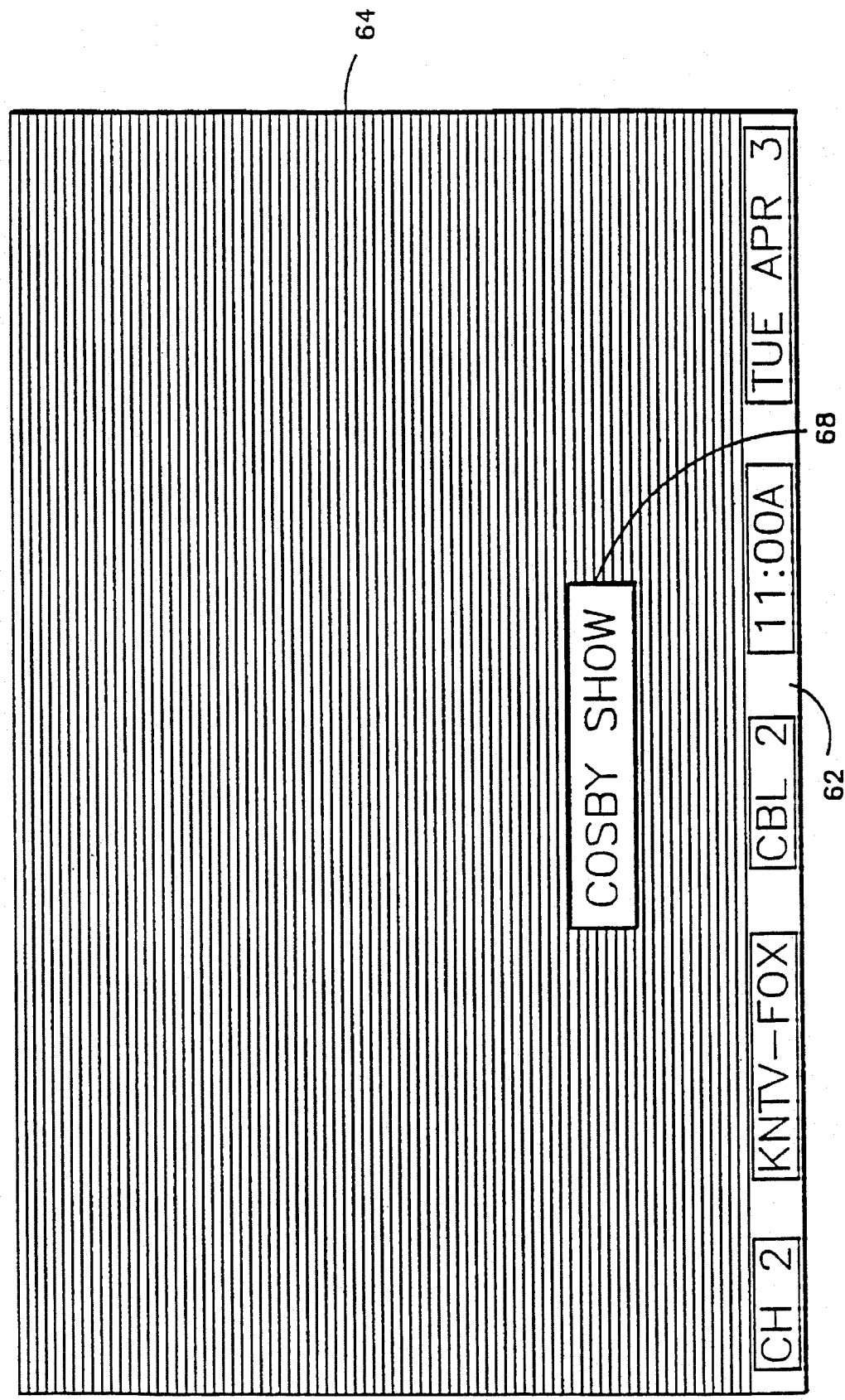
FIGS. 9–10 are additional diagrammatic representations of screen displays of the user interface for the system and process of the invention.
Figure 10:
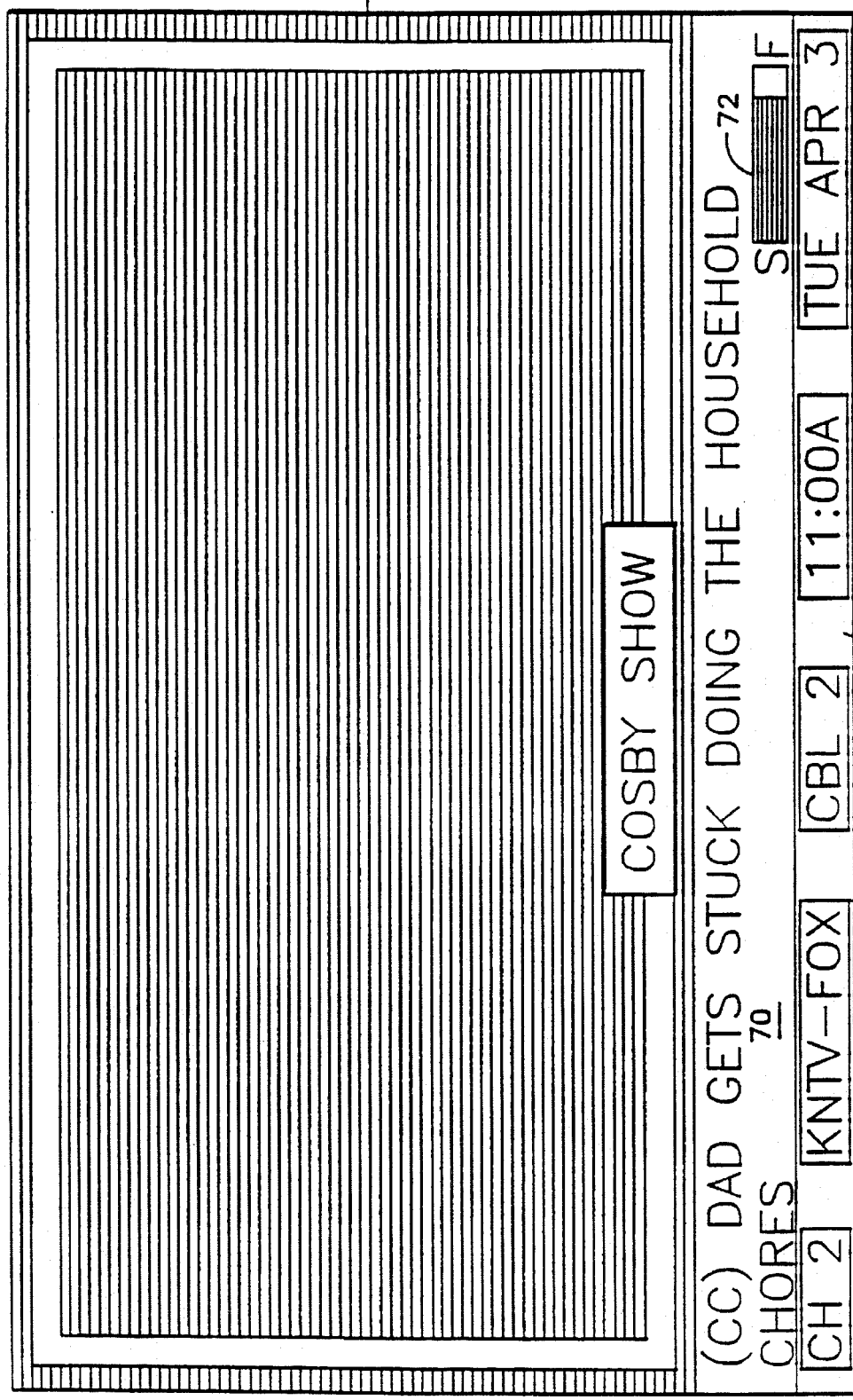
Figure 11:
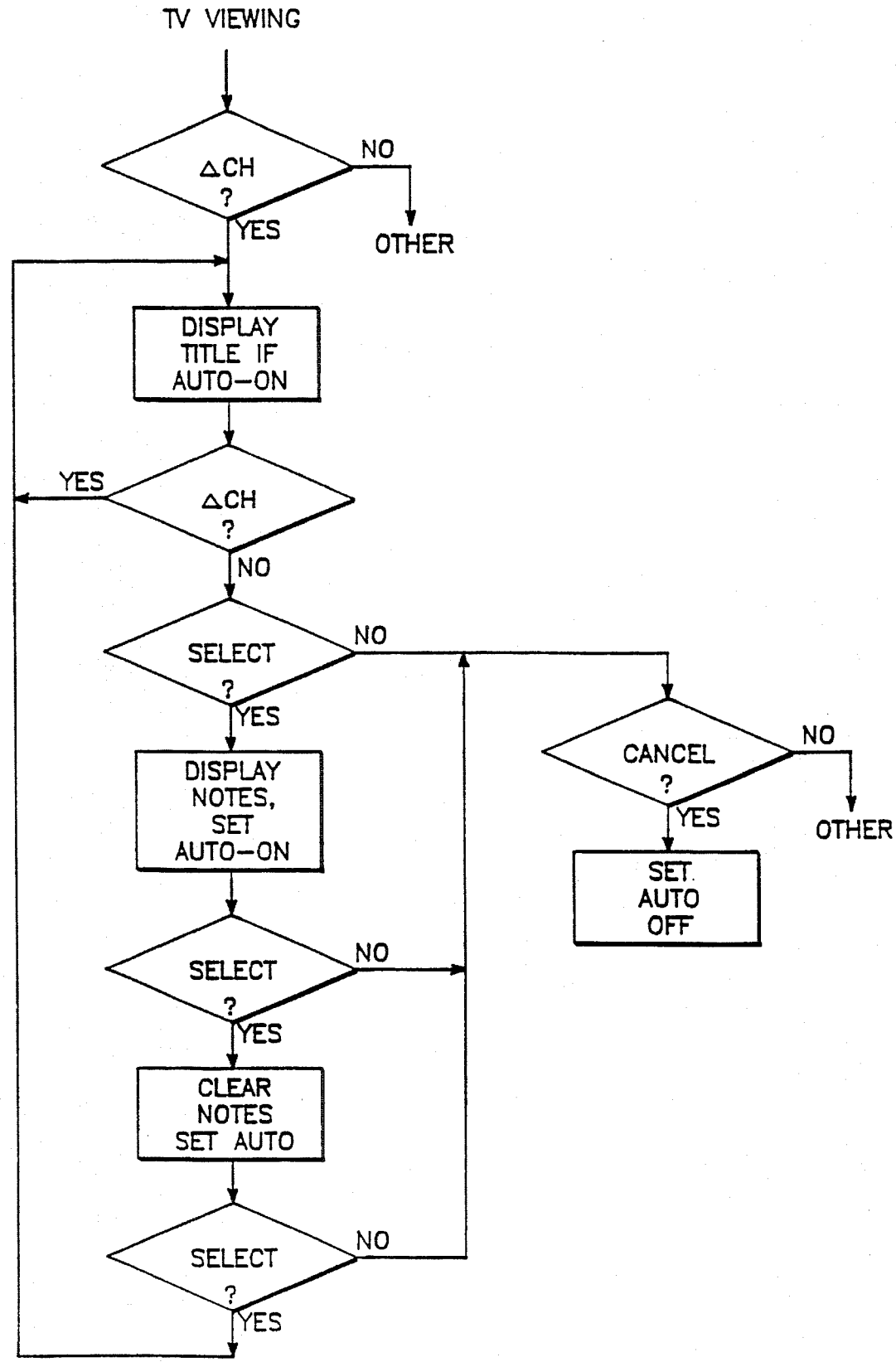
FIG. 11 is a flow chart for understanding the operation of the FIGS. 9–10 diagrams.

FIGS. 9 and 10 show channel grazing overlays 64 and 66 that provide information on current programs when switching channels while watching television. In the overlay 64, when scanning channels, the title of each program is overlaid at 68, along with the name of the TV service (HBO, ABC etc.), the cable channel number, and the current date, day of week, and time in the channel information field 62. The overlay 66 is the same as the overlay 64 except that this overlay includes a program note 70, which is similar to the program note 52 in FIG. 6, but contains information pertinent to a program currently being broadcast on the selected channel. To access program notes, press the Select key. In addition to the program note 70, elapsed time is indicated by a percentage calibrated time bar 72. The bar is bracketed by S for start, and F for finish. By default, titles will appear automatically when channels are scanned. Grazing Titles may be de-activated using the CANCEL key. To restore auto-titles, press Select while viewing TV. The flow diagram governing titles/program notes, while viewing TV, is shown in FIG. 11.

Figure 12:
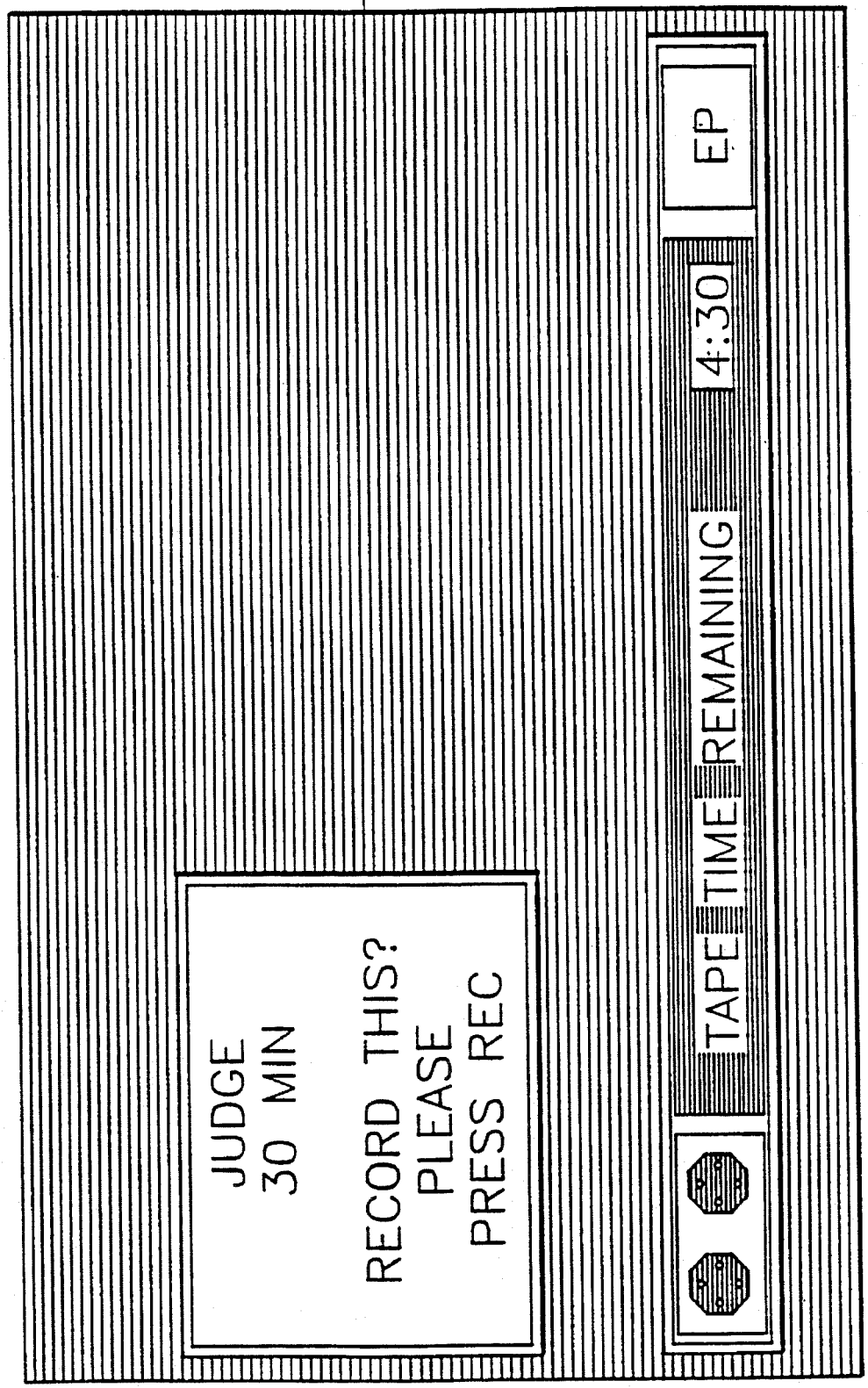
FIGS. 12–13 are diagrammatic representations of taping and tape index screen displays of the user interface for the system and process of the invention.

An express recording screen 74 is shown in FIG. 12. The express recording screen includes the following information:

Title of Program

Length of Program

Tape Time Remaining

Recording Speed.

Figure 13:
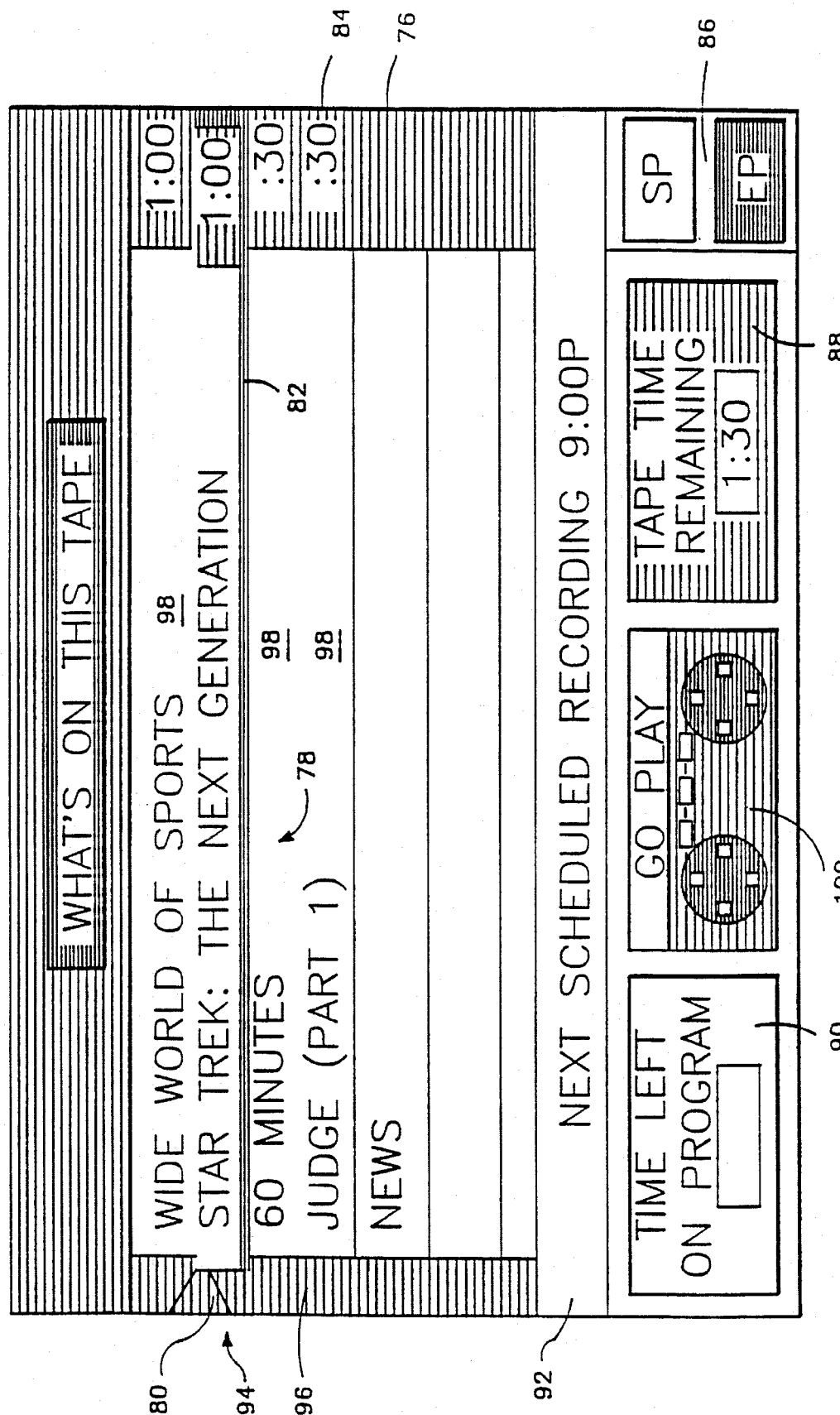
Figure 14:
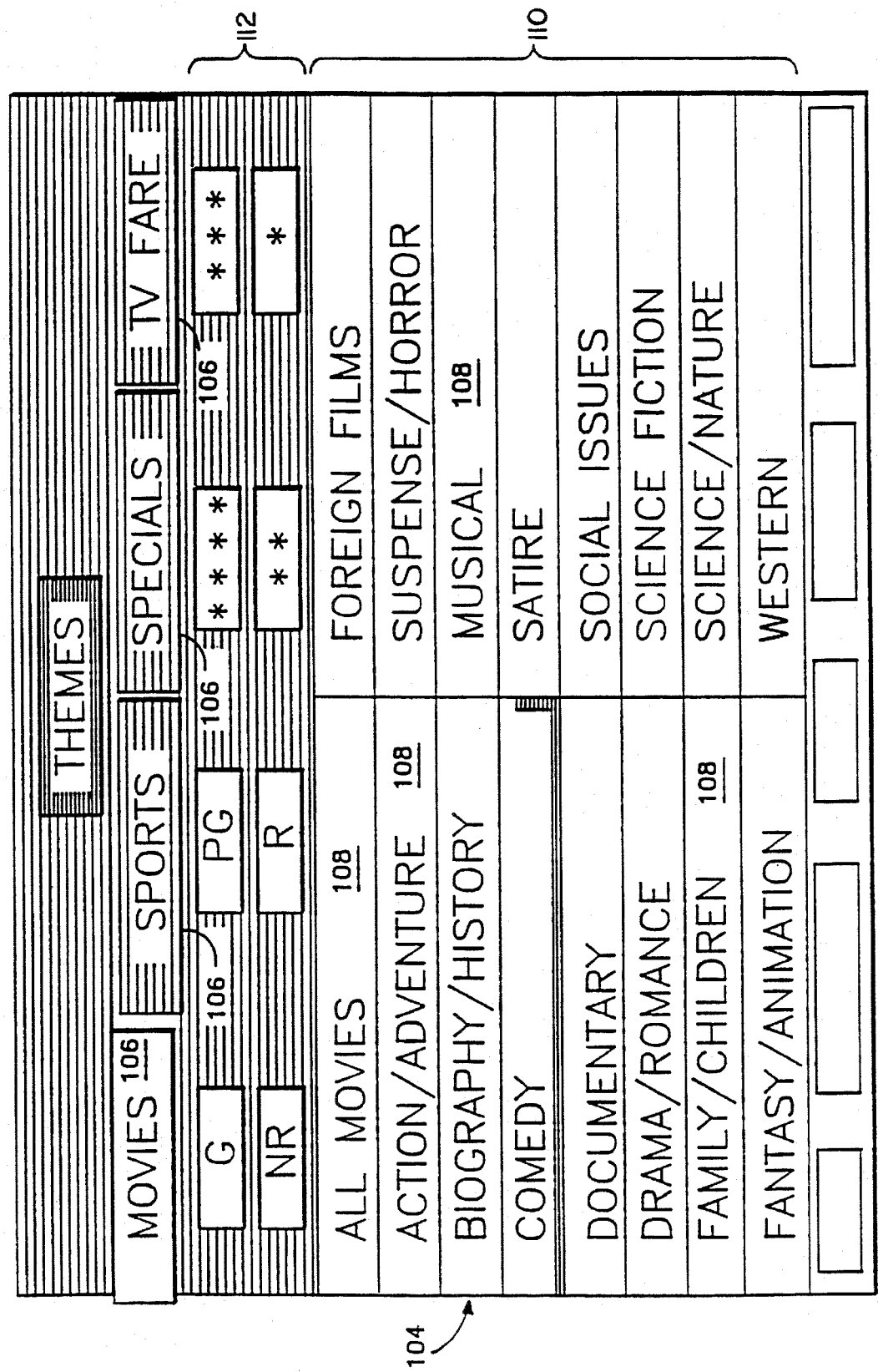
FIG. 14–17 are diagrammatic representations of program selection by category screen displays of the user interface for the system and process of the invention.
Figure 15:
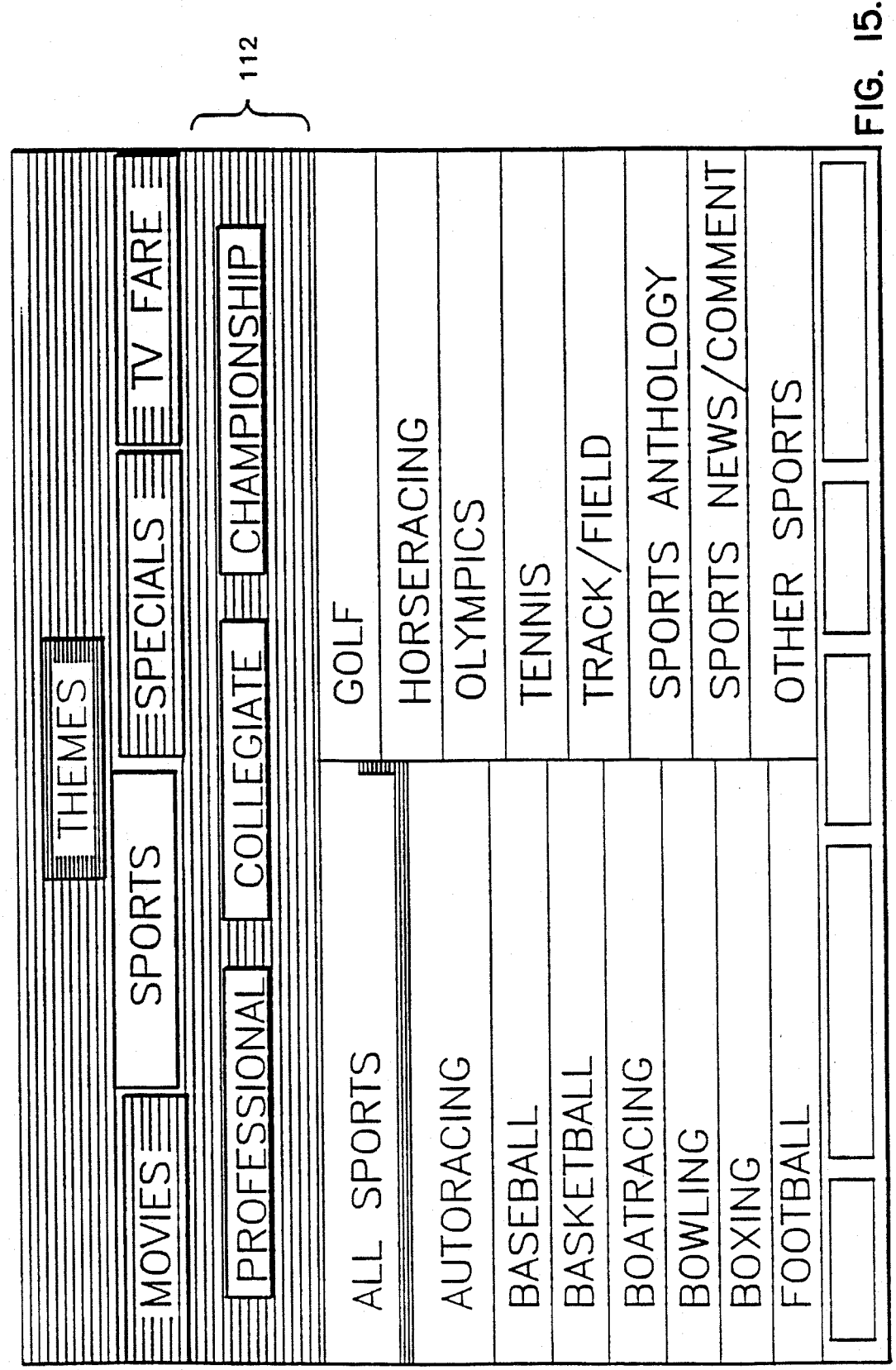
Figure 16:
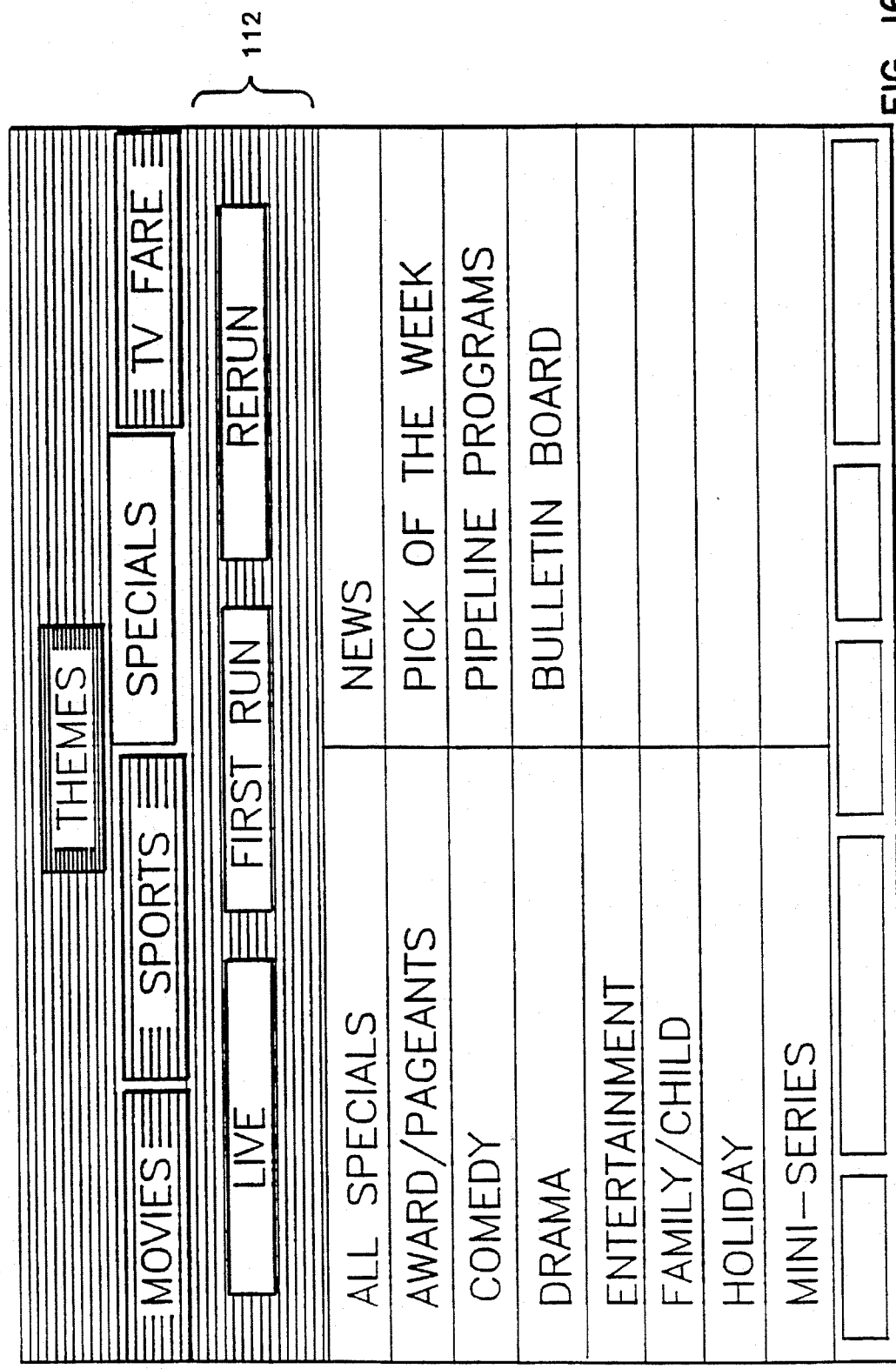
Figure 17:
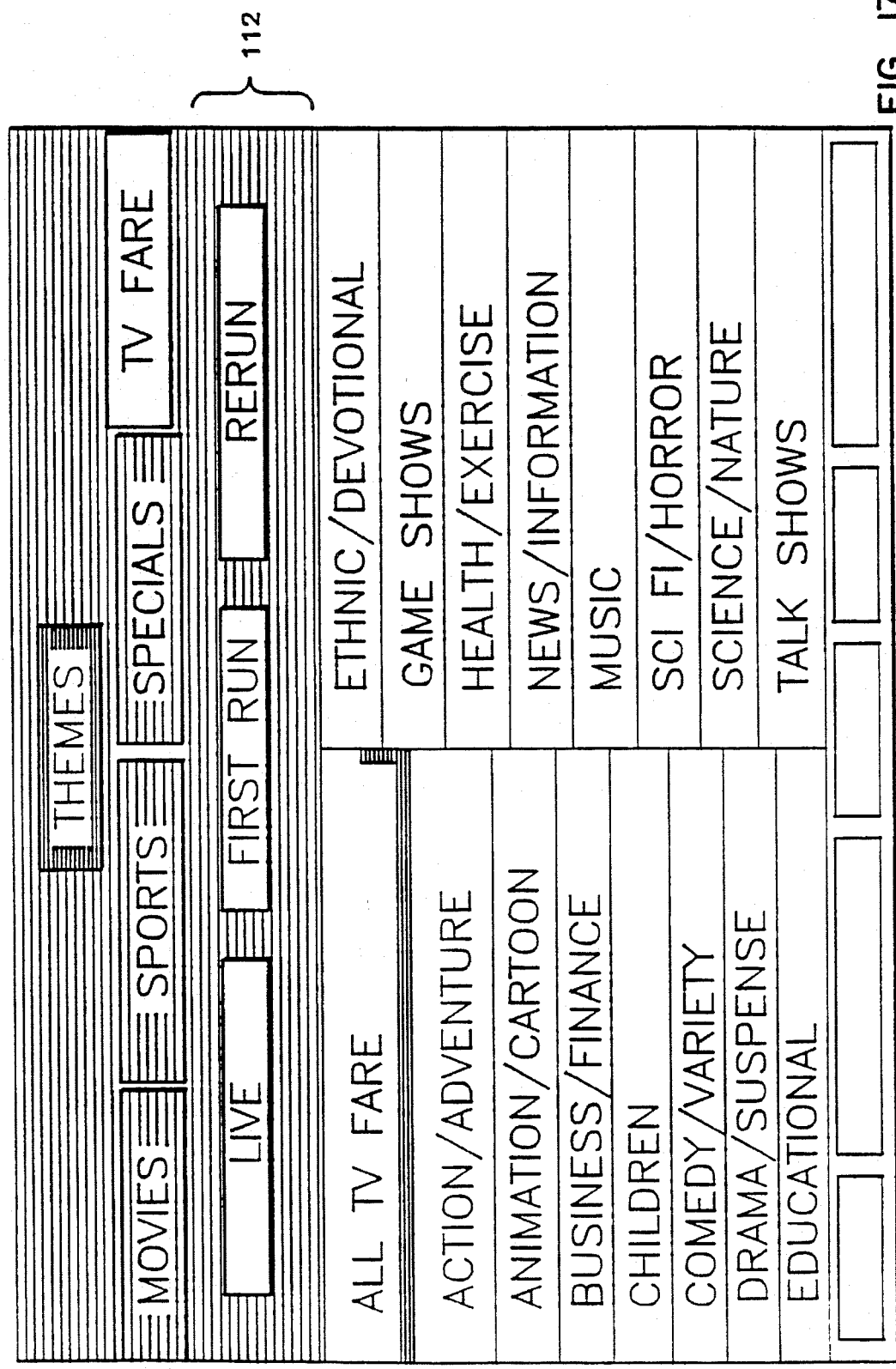

FIG. 13 shows a tape index screen 76. Locating a recorded segment is often an arduous task when several programs have been recorded on the tape. Without a table of contents, the VCR users muddle through stretches of recording trying to find what's recorded on the tape, where the beginning of the desired program is, and where the tape is now. Some premium VCRs provide tape indexing that automatically finds the start of each recording. However, while the viewer can find the start of a recording, the indexing VCRs do not record titles. The net result is about as useful as a having a table of contents without chapter titles. Considerable searching is still required to find what is recorded at each index. The tape index screen 76 provides a virtual tape directory, giving the equivalent function of a table of contents for a tape recording. There is a list 78 of titles of recorded programs, a pointer 80 to the start of the program, and a current position indicator cursor 82 showing the "chapter" location on the tape. The virtual directory is automatically compiled, revised and stored in off-tape memory as the user records over the tape.

The What's on Tape command will display a list of titles of programs recorded on the tape. The title of the selected program (the segment of tape that is positioned over tape head) is highlighted by the cursor 82. The tape position pointer 80 dynamically tracks the current tape position. All searching is done simply by title, bypassing the need for index numbers. To play back a program, the up/down cursor command is used to select the program. For example, to play back Judge, the down cursor is pressed until it highlights the program Judge. As seen in FIG. 13, the tape head is currently positioned over Star Trek with the cursor on Star Trek. When the cursor is moved to Judge, the tape will immediately begin going forward to the start of Judge. Although the cursor immediately underscores the Judge listing, the tape lags behind as shown by tape position indicator 80, which will be gradually moving down. To graphically portray tape movement, a tape motion indicator field, block 100, is provided, as explained below.

The tape directory is equivalent to a table of contents showing titles, but not page number. It automatically opens to the starting page by simply pointing to the title of the program. In addition to the tape directory 78 of recorded programs, the screen 76 includes a program duration field 84, a recorded speed of each title field 86, a remaining time left on tape field 88, a remaining time left on program field 90 and a next scheduled recording time field 92.

The virtual tape directory is generated as follows. It is difficult to implement a competent self-contained tape directory for a non-random access storage such as a video tape. No matter where the directory is stored on the tape, the latent access time to locate the directory and return to current position (for a standard six hour tape) is excruciating slow, in the order of 6 to 10 minutes.

If redundant directories are recorded uniformly across the tape to minimize latency time, the problem of sluggishness is merely shifted from playback to updating the multiple directories. After each video program is recorded, the entire tape must be scanned to update each directory. Even if this update process is automated, there is a question of excessive wear on tapes and the VCR itself. Viz.: each recording, no matter how short, results in high-speed scanning of the entire tape in order to revise all directories.

Even more troubling is the question of when to perform the update, since there is no "safe" period for the VCR to take control. For example, the user may have stopped the tape momentarily, perhaps to skip commercials, only to find that the VCR has commandeered control and place the tape in a high speed update mode. The safest update is one that is user-initiated. Unfortunately, few VCR users will follow a regimented procedure of updating after each recording session. Clearly, an on-tape directory based on existing technology is not satisfactory.

The following innovative solution, the "virtual tape directory", stores directory information in off-tape memory and does not require an on-tape directory or any augmentation of the video cassette. Since the directory is held in external memory instead of the tape, it is best suited for tapes that have recently been played and recorded, the "working tapes".

When a program is recorded, the title of the program is written to the data (control track) channel of the tape and, at the same time stored in a non-volatile (NV) memory. Other information about the recorded program, such as length of program, theme category, date recorded, and tape identifier code may be written to the data channel, as well as stored in the NV memory. The NV memory is adequate to support a number of working tapes.

When a tape is first loaded, the tape data channel will be scanned for a few seconds to identify the recorded program under the tape head. This data will be matched against the directories stored in NV memory. If there is a match, the directory of the working tape will be displayed immediately when the What's On Tape key is pressed. The "virtual" tape directory appears to have been read from the tape, but is actually obtained from NV memory.

If there is no match, a new directory for the tape will be created. During playback and recording of this tape, a virtual directory will be generated for that tape. Directories of inactive tapes will be automatically purged from memory as new working tapes are introduced.

The foregoing off-tape realization of the virtual tape directory is an approach that can be implemented without any alterations to existing video cassettes. However, with minor augmentation of the video tape cassette and video recorder mechanism, a true random-access permanent directory for each tape can be realized.

In a preferred implementation, a digitally encodable read\write planar magnetic strip is located on a surface of the video cassette. Ideally, the strip will be located on one of the four planes which are orthogonal to the direction of video cassette insertion, for a front loading VCR. A most preferred location is on the face of the video cassette, which is usually reserved for a 1½" by 2" label. In the video recorder, a read\write magnetic head is located to be aligned with the magnetic strip as the cassette is inserted. The head comes into contact with the magnetic strip when the cassette is loaded or removed from the recorder. As the cassette is inserted, the stored data from the strip will be read and transferred to the tape directory buffer of the electronic guide. When programs are recorded on or erased from the tape, the content of the tape directory buffer will be updated to reflect the program content and index location of the program on the video tape. As the video cassette is ejected from the recorder, the content of the tape directory will be transferred to the magnetic strip on the video cassette. By augmenting the video cassette with a random access rewrite permanent memory, directory information for the tape is retained long after a video record session. This method is a significant improvement over using the tape media itself to record directory information.

In the above method, the movement of the video cassette magnetic strip during cassette insertion and ejection over a stationary magnetic head allows the magnetic flux changes to be sensed. Alternatively, a moving or rotating read\write magnetic head mounted on the video recorder can be used to scan a stationary magnetic strip after the video cassette is loaded. In this variation, data from the magnetic strip can be read and updated immediately from the tape directory buffer. Such magnetic strip encoding is similar to that commonly used in credit cards, personnel identification tags, security entrance cards, etc. As another alternative, optical read\write methods may be used instead of magnetic encoding.

It is relatively easy to estimate remaining time of a scheduled televised program with the assist of a clock and a TV schedule. In contrast, there are few clues as to current location during playback of a recorded program, particularly when there are several recorded segments on a tape. Tape index counters or running-time clocks require diligent bookkeeping before the start of a recorded segment. Few consumers will tinker with 5 or 6 digit numbers when a "ballpark" indicator is adequate, such as, "is the program about over?", or "about when does the next segment starts?". Clearly, there is need to provide a location indicator without the burden of bookkeeping.

To provide an at-a-glance indicator of relative tape location, an on-screen tape position gauge 94 has been devised.

The tape position gauge 94 consists of a vertical bar 96 with the arrow pointer 80 located on the left edge of the screen 76. The arrow 80 dynamically tracks the current tape position as the tape is advanced or rewound.

The gauge 94 is graduated, not in linear units, but in units of recorded segments 98 with each segment labelled with its program title. Thus, a 10 minute program or a 6 hour program is represented as one vertical unit corresponding to the height of the left vertical edge of a title line. Since the left vertical edge of a title is the same for all programs (independent of program duration), the position indicator is only a rough approximation of actual tape position. If the arrow is pointing at the upper 25% of the left vertical edge of a title line, it indicates that the tape head is positioned approximately into the first 25% of the program. If a conventional linear gauge were displayed, a far more complicated gauge would be required, that would likely confuse rather than clarify.

As noted by the tape position indicator 80 in FIG. 13, the tape head is positioned to the start of Star Trek. If the viewer wishes to play back another program, the cursor is simply moved until it highlights the desired program. As soon as the cursor is moved to another program, the tape will immediately go forward or backward to the selected program. Tape position pointer 80 will move very slowly if it is scanning past a long program. This motion may not be readily apparent. To provide an unequivocal graphic representation, a tape motion indicator field, block 100, indicates direction of scanning and whether the tape is being prepared for playback or for recording.

Thus, this tape gauge 94 provides a quick capsule indication of the where the tape head is currently positioned, relative to the current program, and relative to other programs or the tape, and the title of other programs.

The tape index screen 76 includes a tape motion indicator field 100. When the tape is undergoing high speed repositioning, the What's On This Tape (WOT) screen 76 will be displayed. During high speed search of a long program, the tape gauge 94 will appear to be dormant, since the gauge is relatively coarse for programs of long duration. To supplement the tape gauge 94, the tape indicator 100 is included. During high speed positioning, one of these messages will be displayed in the space above twin-hub tape icon 102: GO PLAY, GO RECORD, FORWARDING, REVERSING, PAUSE, and STOP.

GO PLAY is displayed while the tape is repositioning to the selected title. When the title is reached, the WOT screen 76 will be displaced by the playback video. GO RECORD is displayed while the tape is positioning to the selected program segment 98, where the new recording will be written.

FIGS. 14–17 show Theme function screens 104. The Theme function allows the viewer to quickly sort the downloaded schedule and display a subset schedule based on a subject of interest. The user has the freedom to select listings sorted first by major themes, second by topic(s) within a theme, and/or by topic qualifiers. All guides sorted by theme, topic and qualifier will be displayed in a row-tabulated format and begins by listing programs nearest to the current half-hour. The theme function screens 104 have the following attributes: Rotating Themes. There are four theme categories, with each theme title enclosed in horizontally-arranged selection boxes 106. From left to right, the themes are:

[Movies]  [Sports]  [Specials]  [TV Fare]

Figure 18:
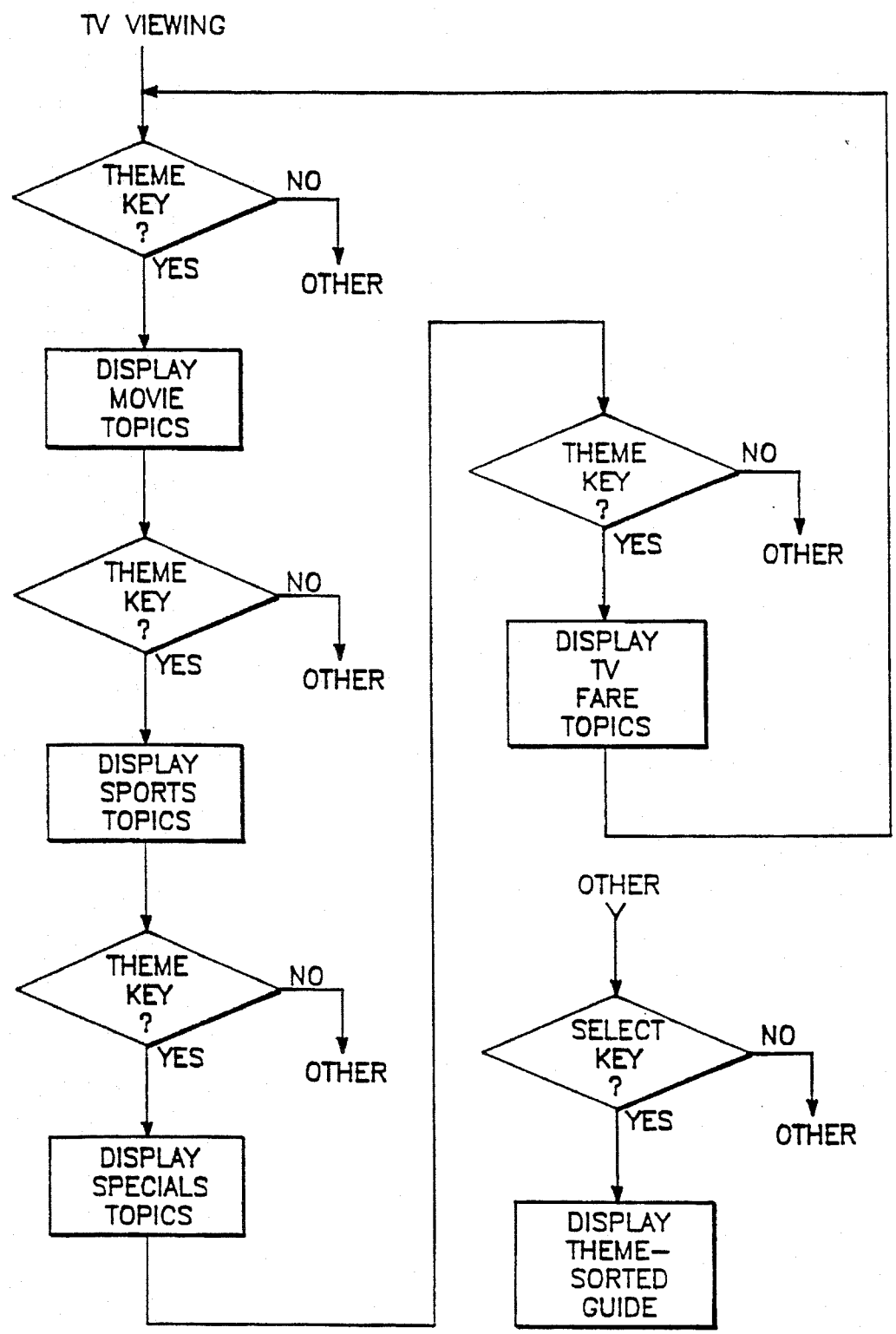
FIG. 18 is a flow chart for understanding operation of the FIGS. 14–18 diagrams.

FIG. 18 is a flow diagram defining the Theme command. Topic Selection. There are up to 16 topics 108 for each theme arranged in an 8 row by two column field 110. Any number of topics may be selected under a selected theme. Topics is a logical OR function, meaning that each listing that meets the definition of the topic will be displayed. For example under the theme of Movies, if the topic titles Comedy and Satire are selected, a subset schedule of both comedy movies and satire movies will be displayed. Other qualifiers may include a Pay Per View selection box in addition to the Live selection box of FIGS. 16 and 17.

Default All Selection: when the Theme screen 104 is first opened, the first slot (upper left most topic 108) will be highlighted. This is the ALL function, which is the sum of all topics 108 for the selected theme. The ALL function was created to minimize key stroking.

Without an all topic category, the user must enable all 16 topics 108 individually. Conversely, if the user wishes to go from an all topics to an individual topic, the user must cursor to and deselect each of the other 15 topics.

Qualifiers: each theme includes a group of search attributes or qualifiers 112. The qualifiers for each theme 106 are shown in the respective one of FIGS. 14–17 for each theme 106. Any number of qualifiers can be enabled at one time. These qualifiers perform a logical OR functions; they will select for display all listings (sorted first by theme and topic) that satisfy the qualifiers.

The qualifiers 112 are positioned for easy selection. The selection of qualifiers is made using the usual cursor commands. When a theme 106 is initially opened, by default, the cursor is located near the top of the screen. To minimize cursor commands, the qualifiers are also located near the top of the screen. In contrast, placing the qualifiers at the bottom of the screen would require a round trip of up to 16 key strokes.

The complete theme sorting strategy is defined as follows:

Listings =

$$(TopicA + TopicB + \text{etc.}) \times (\text{Qualifier } A + \text{Qualifier} b + \text{etc.})$$

This may be read as listing all Topic A that also meets Qualifier A or Qualifier B, plus all Topic B that also meets Qualifier A or Qualifier B, etc. For example, the qualifier field of FIG. 14 includes four star **, three star *, two star ** and one star * rated TV programs, based on the auxiliary schedule information described above. By selecting both the ** and * boxes, only programs that have at least a three star rating will be listed. Other criteria, such as year of release, may also be included as a qualifier field. In this case, the guide will restrict listings to movies or TV shows released during a specified year period. The year period may be implemented with two selection boxes: the first box indicating the start year and the next box indicating the end year. To change the year window, the year values may be incremented or decremented with the page up/down keys when a year box is selected.

Qualifiers, topics and themes are rooted in relational database operations and allow logical sorting of the schedule. To support these higher order of sorting, auxiliary data must be delivered to the VCR. In contrast, simple sorting operations, such as sorting by time and by channel are inherent in the fundamental information of a TV guide, and do not require auxiliary search data.

The keystroke sequence for using the themes screens 104 are as follows. While watching TV, the first Theme key command will summon the opening theme screen with the left most theme, Movies, highlighted. Further theme commands will rotate the theme selection from left to right. Each theme screen will be initialized to the ALL (topics) selection. If no topic selection is made, an all topics guide for the selected theme will be displayed upon depressing the Select/ Goto command.

To additionally sort the theme by a single topic, position the cursor key to the desired topic and depress the Select/ Goto key. Use the cursor to return to a topic.

To sort by more than one topic, position the cursor over each desired topic and depress the Select key. When finished, press Select/Goto to display a multiple-topic guide.

To sort by one or more attributes, position the cursor over each desired attribute and press the Select key. When finished, move the cursor to a topic and press Select/Goto to retrieve the theme/attribute-sorted TV guide.

Other than express recording, all recording activities are controlled with the Record Memo screen 16 of FIG. 4. The Record Memo screen 16 is accessed with a Record Memo key. When the Record Menu key is depressed, the following titles enclosed in horizontally-arranged selection boxes 114 will appear at the top of the opening screen. From left to right:

[Pending Recordings]   [Recorded Programs]   [Linked Titles]   [On-Grid Prog.]

Figure 19:
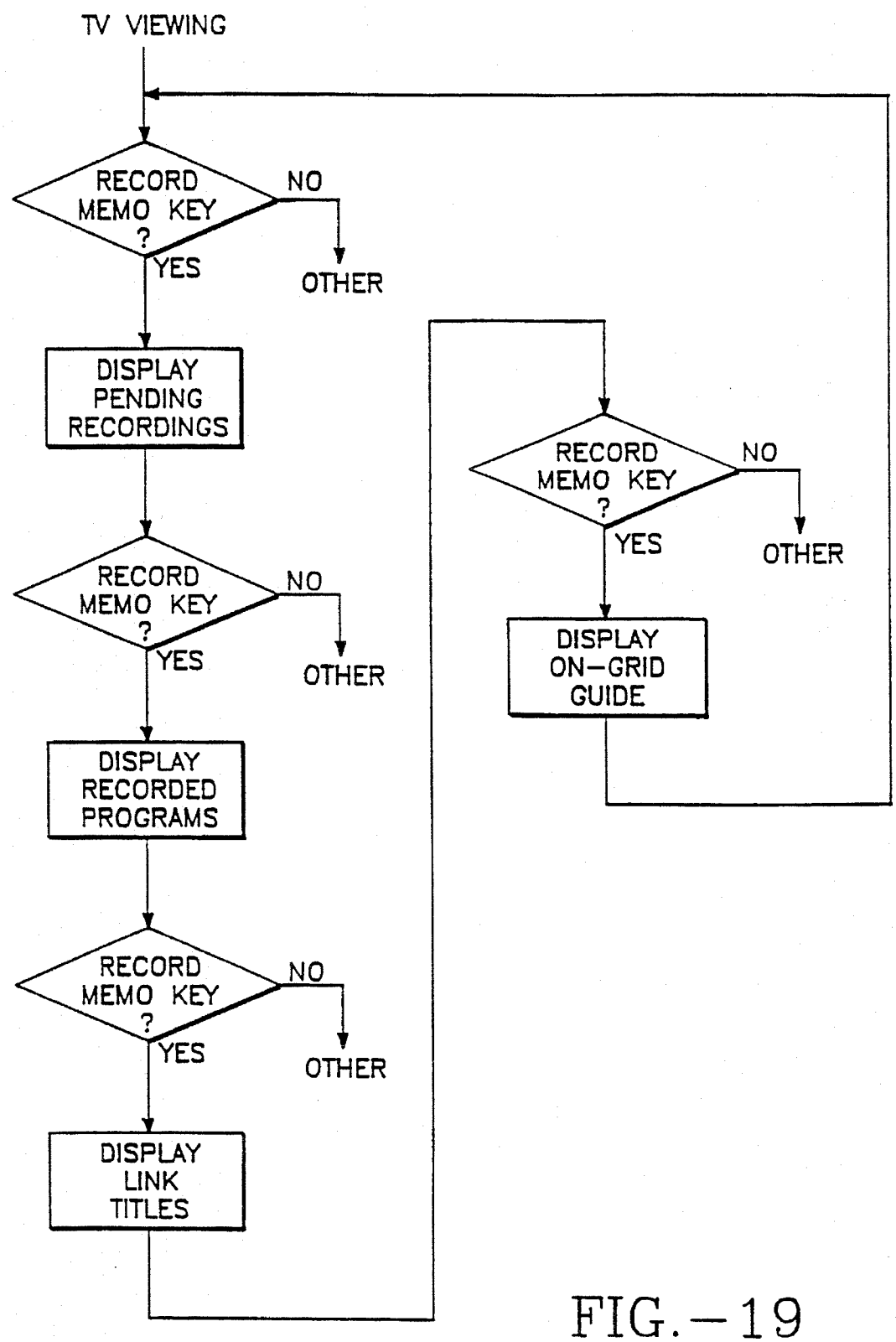
FIG. 19 is a flow chart for understanding operation of the FIG. 20 diagram.

Each Record Memo key command will highlight a new selection, rotating from left to right, and wrapping around to Pending Recordings after the right most position. FIG. 19 is a flow diagram defining the Record Memo command.

FIG. 20 shows a Channel Customization screen 116, which is an example of one embodiment of a channel selection menu. The screen 116 allows the user to customize channels to match viewing interest, providing a compact listing as well as eliminating undesired channels during up down scanning. During schedule update, a list of all cable channels available at the subscriber's cable system (or broadcast stations for over-the-air subscribers) is also delivered to the VCR. This unabridged set of channels may be customized using screen 116.

The channel customization screen 116 has two fields, a 3 column field 118 listing up to 36 unabridged channels and a single column field 120 listing 12 favorite MY channels. The latter is a replica of the channel descriptor column 122 (FIG. 1) of the opening grid guide. Additional pages are available (using the page key to swap between the pages) to accommodate systems with more than 36 channels. Each cell 124 in the 3 column field 118 contains the following information:
Channel number and program service name (such as HBO or station KTVU, 2). The cell 124 is color-coded to indicate the following states:
ON, default state before any customization, with the cell 124 in light green background.
MY, favorite channels listed in the single column field 120, also shown in the three column field 118 with a blue background.
OFF, a channel deleted from all guides, as well as during Channel Up/Dn scanning (still accessible using the ten key channel keypad). OFF cells have a gray background.

When first installed, the system assigns the first 12 (listed in numerical order) channels as MY favorites. The channel status may be changed by selecting a channel and picking a state, MY, ON, or OFF using the SELECT key. Since only 12 favorites are allowed, the user must first remove a favorite channel by changing the status of an existing favorite channel to OFF or ON. When that is done, the first column will automatically open up a space for the next MY selection. When a new MY is selected, the MY column 120 will automatically insert the new selection in the prescribed order. The order of listing in the MY favorite channel column 120 is as follows:

All favorite broadcast stations will be listed first in numerical order. Next, all cable services will be listed in alphabetical order.

A new cable service, which displaces a previous service, will be inserted under the previous status. Example: If the channel was MY, the new service will be MY. However, a new cable service that appears on a new channel will be initialized ON.

In another embodiment of the channel customization method, any number of channels may be arranged to suit the preference of the viewer. In this approach, column 54 is not required and is not displayed. Instead, any channel listed in the three-column field may be re-ordered in any sequence desired. In this method, a channel whose order is desired to be changed is selected using a cursor. A destination slot is then selected and the transfer is made, with intervening channels being adjusted in position towards the source slot. For example, to move channel 30 DIS to the number one slot (shown occupied by channel 2, KTVU), the source channel (DIS) is first highlighted by positioning the cursor and pressing the SEL/GOTO key. The selected channel will then appear as slightly offset from its normal position (not shown in the drawing). The Up/Down cursor commands are then used to move the cursor to the destination slot (KTVU), and the SEL/GOTO key is then pressed again. Channel 30 (DIS) will then appear in the first slot, and all channels that were previously from the destination slot to just above the source slot will be moved down one slot. If a channel is moved to a lower position rather than a higher position, all channels previously from the destination slot to just after the source slot will be moved up one slot.

In yet another embodiment of the channel customization method, the viewer can re-order channels using a drag and drop method. Again, the cursor is used to select a channel in a source slot. An image representing the channel symbol is then dragged into the desired destination slot for the channel and dropped, and intervening channels are adjusted as discussed above.

Another embodiment employs channel customization prompt menus to re-arrange channels. In this approach, each channel label is sequentially displayed over time in a default sequence (such as numeric/alphabetic sequence, or according to the previously selected user-sequence). The channels are preferably displayed one at a time. The viewer can select a priority for each channel as it is displayed or can skip to the next channel label. If a priority is given, the channel will be moved into the channel slot corresponding to the entered priority, as if it were selected and moved into that slot as discussed above. The priorities that may be assigned range from 1 to 9, the highest number on the numeric keypad (in some embodiments 0 is used to represent 10). Note that the total number of channels that can be re-arranged is not limited to the number of priorities (9). For example, the user could assign the same priority (such as number 1) to as many channel labels as desired. The last selected channel label would then appear in the number 1 slot, with the remainder immediately following below, according to the order in which they were selected.

Figure 21:
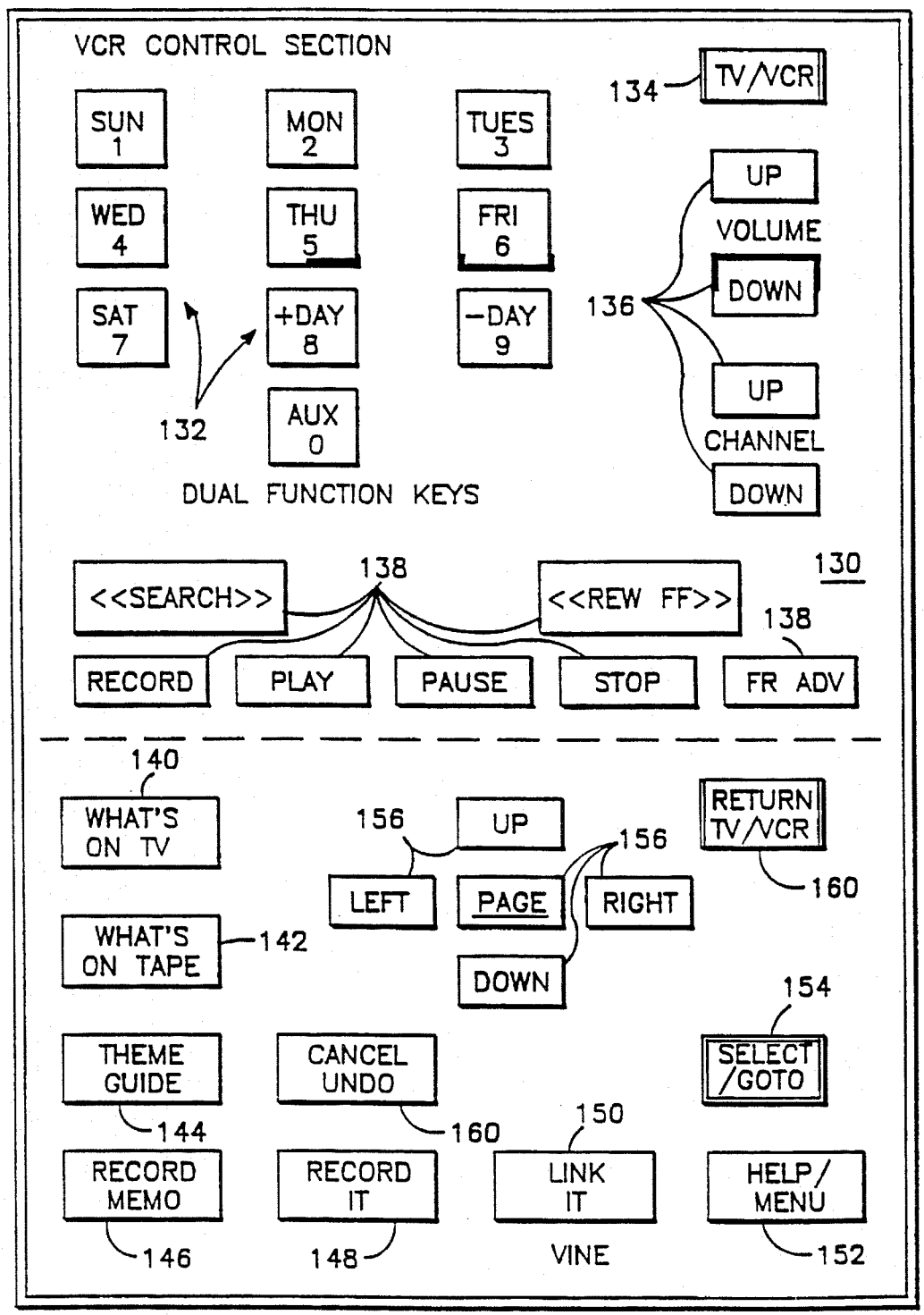
FIG. 21 is a diagrammatic plan view of a control panel for the system of the invention.

FIG. 21 shows a front panel 130 for a remote controller of the schedule system. The top half of the front panel 130 corresponds to a conventional remote controller for a television set and a VCR. Included are a dual function ten key keypad 132, with the alternate functions of each key and its digit shown, a TV/VCR toggle key 134, volume and channel up/down keys 136, and VCR control keys 138. The lower half of the front panel 130 contains control keys that are specific to the schedule system. Included are a What's On Tape key 140, a What's On TV key 142, a Theme key 144, a Record Memo key 146, a Record It key 148, a Link It key 150, a Help/Menu key 152, a Select/Goto key 154, Left, Right, Up, Down and Page Cursor keys 156, a Return TV/VCR key 158 and a Cancel/Undo key 160. The use of these keys has either been explained above or is apparent from their labels.

Figure 22A:
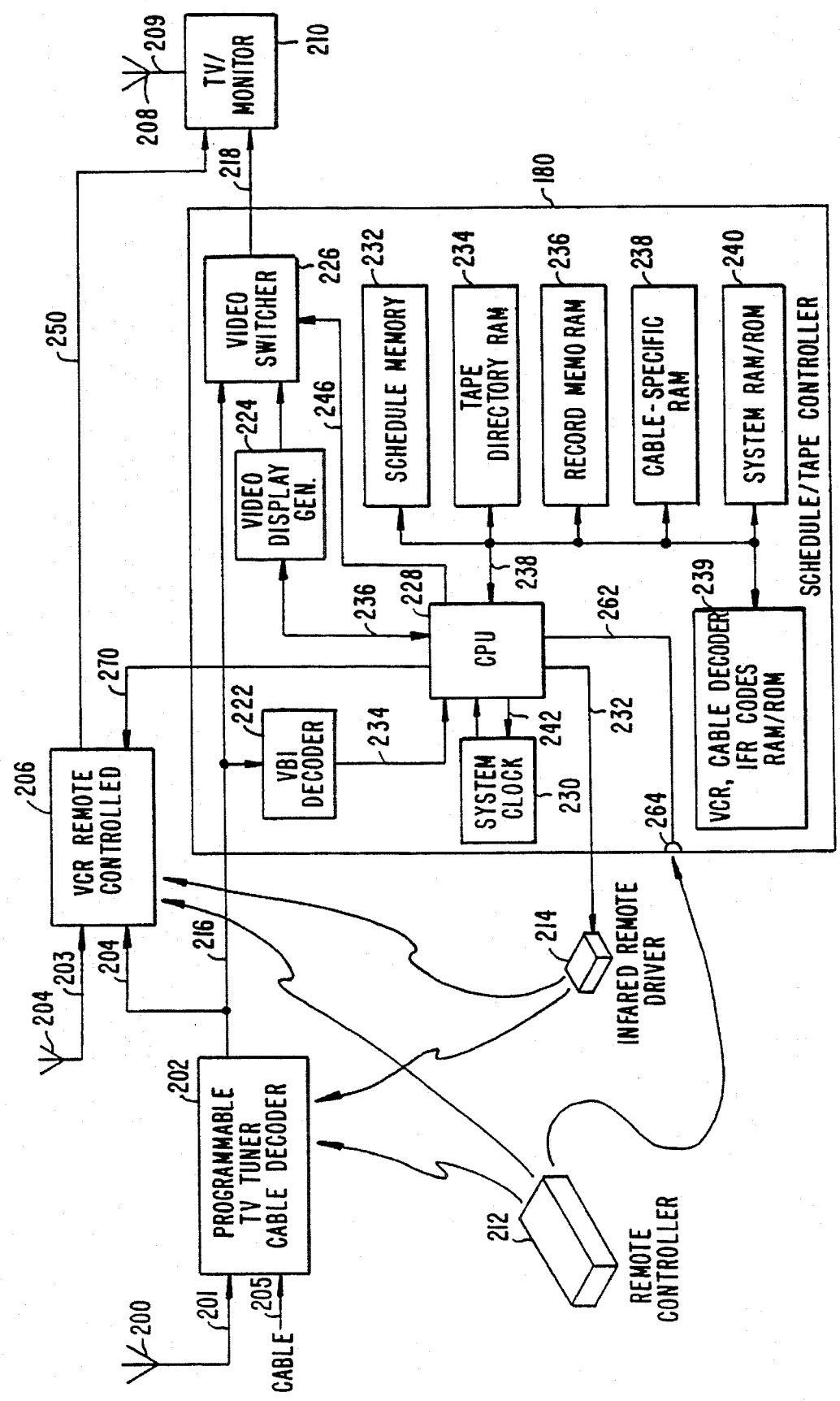
FIGS. 22a and 22b are block diagrams of television schedule systems in accordance with the invention.
Figure 22B:
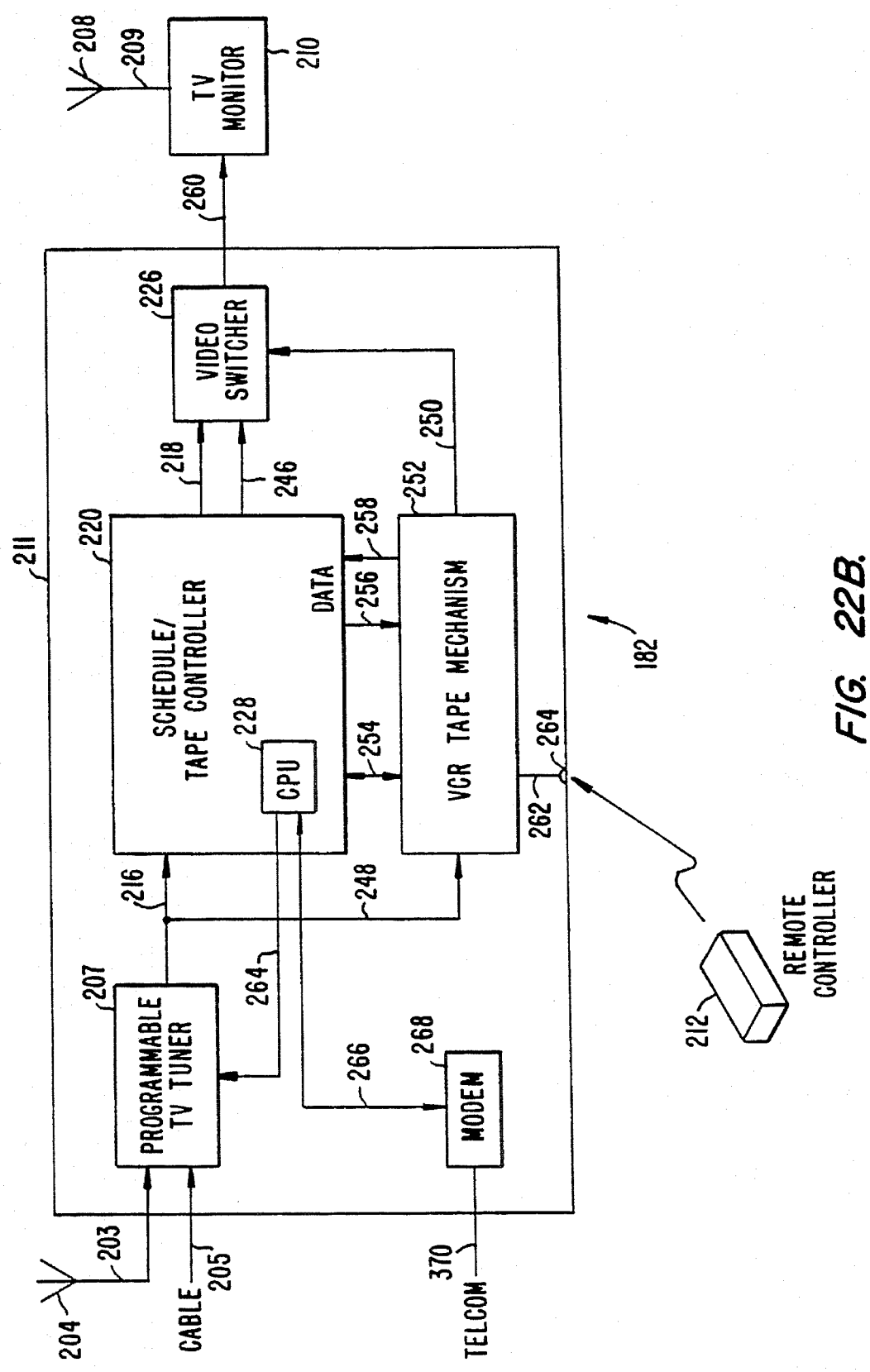

FIGS. 22A and 22B are block diagrams of television schedule systems/tape controllers 180 and 182 in which the user interface is used. The schedule system/controller 180 is applicable to existing television equipment, where the schedule system is separate from the basic television equipment. Programmable tuner 202 is shown as part of a cable decoder. The schedule system/controller 182 is shown as integrated into a VCR 211. In this version, a cable decoder is not required, and tuner 207 is part of the VCR 211. It should be clear from these two systems 180 and 182 that the schedule/tape controller may be integrated into other television equipment, such as a cable decoder or a TV/Monitor receiver. It is also practical to implement the entire schedule/tape controller in a remote controller by adding a text display, such as an LCD screen, on remote controller 212.

In the system 180, programmable tuner 202, which may be part of a cable decoder unit, receives a TV signal from antenna 200 and/or from cable input 205. Tuner output 216 goes to a vertical blanking interval (VBI) decoder 222, which may be a closed caption decoder or a high speed teletext decoder. Listing information and other support information, such as cable channel assignment data, will be transmitted over the VBI by one or more local stations or cable channels several times a day or continuously.

When update is required, programmable tuner 202 will be tuned automatically to the station or cable channel carrying the data. After the VBI signal is processed by CPU 228, the listing data is stored in schedule memory 232, while the cable channel assignment data is stored in cable-specific RAM memory 238. This data is used to convert generic TV source names, such as HBO, to channel assignments for the specific cable system.

Other information transmitted to the schedule/tape controller 180 and stored in the system RAM memory 240 includes clock update data to set system clock 230 automatically, schedule update time, which may vary from once a day to a continuously transmitted format, new theme categories, and last minute schedule change data.

For a What's on TV request, the listing stored in schedule memory 232 is retrieved, processed by CPU 228, and outputted to video display generator 224. Video switcher 226 is enabled by CPU output 246 to select the video display generator 224 output whenever schedule data is to be presented to the TV/monitor 210.

When a request to time-shift record a program is made, the title of the program and its record parameters (channel, start time and length) is copied from the schedule memory 232 to the Record Memo RAM memory 236. When the system clock 230 matches the schedule time, the CPU 228 will issue a channel command to the programmable tuner of the cable decoder 202 (tuning it to the selected channel), and a power on and record command to VCR 206 by means of an infrared remote driver 214 directed at infrared input ports of these two devices. In the VCR integrated version 182, the command to the tuner 207 is made on a wired bus 264.

In addition to programming by selecting a title from the on-screen schedule, it is also possible to program the VCR 206 or 211 and the cable decoder 202 or 207 with remote controller 212. In this mode, programming information is entered into the remote controller 212, and at the desired activation time, the remote controller 212 will issue programming commands to the proper TV device. While there are universal remote controllers that offer programming capability, none allow the user to enter generic names, such as station and cable channel names, and have the CPU convert the names to specific channels for tuning the VCR or the cable decoder. This is implemented by incorporating CPU 28 and the cable-specific RAM 238 in the remote controller 212.

Remote controller 212 and infrared remote driver 214 are capable of emulating the infrared command instructions required by the cable decoder 202 and VCR 206. The command emulation codes for the remote driver 214 are stored in cable decoder IFR code RAM/ROM memory 239. Commands for popular cable decoders and VCRs are pre-programmed in ROM. Alternatively, the infrared commands of the original remote controller may be learned by aiming the controllers at the IFR input receiver 264 and storing the command codes in RAM memory 239 after processing by CPU 228. This process is well known in the art of universal remote controllers and need not be detailed here.

As shown in FIG. 22A, the VCR 206 and cable decoder 202 may be manually controlled by remote controller 212, or it may be automatically controlled by infrared remote driver 214.

During recording, the tape index location of the VCR 206 will be transmitted over control/data bus 270 to the CPU 228. This start address information is stored in tape directory RAM memory 234, together with the program title. The bus 270 also carries VCR control commands for recording, playback, tuner selection, and other functions, including power on/off.

Once a program is recorded, its title and other program information is stored in a section of the Record Memo RAM memory 236. To play back a recorded program, the What's on Tape request will cause a directory of recorded programs on the tape to be displayed. When a program is selected for playback from this directory, the tape will fast forward or reverse to the tape index location specified in the Tape Directory RAM memory 234.

In the system 182, schedule/tape controller 220 is embedded in the VCR 211. The VCR tape mechanism 252 contains all the record and playback electronics of the video recorder, less the programmable tuner 207. Data recorded on the control track of a tape is coupled to the CPU 228 over input bus 258 and output bus 256. The art of recording data on the control track is well known, for example, in recent VCRs with indexing capability. CPU 228 commands to the VCR 211 are carried over bus 254. When schedule information is to be displayed, video switcher control input 246 selects the display generator on line 218. At other times, video switcher 226 selects the output of the VCR mechanism 252 on line 250. Schedule information may be downloaded from the VBI. Alternatively or supplementally, it may be downloaded from a telecommunication line 370 to modem 268 and to CPU 228 via line 266. Other means of delivering schedule information can be employed, including the use of a sub-carrier channel on the cable service.

It should now be readily apparent to those skilled in the art that a system and method incorporating a novel user interface capable of achieving the stated objects of the invention has been provided. The user interface that is configured to compensate for the particular nature of the television schedule information. The user interface has a cursor operation that compensates for an irregular grid format of the television schedule information. The user interface presents the schedule information in a format that compensates for limited resolution of the television display.

The user interface presents supplemental schedule information in overlays that obscure a minimum amount of useful other information. Order of presentation of the schedule information in the interface is customizable by user preference.

II. Cable Decoder Controller

Turning now to FIG. 23, there is shown a system 2010 for interfacing a cable television decoder 2012 to a VCR 2014 incorporating a television scheduling system of the type disclosed in my above-referenced issued U.S. Pat. No. 4,706,121, which is hereby incorporated by reference in its entirety. As is conventional, the cable signal is supplied to the cable decoder 2012 on cable 2016, and the decoded output of the decoder 2012 is supplied to the VCR 2014 through cable 2018 on a fixed channel. The decoded output on the fixed channel is also selectively supplied to a television set 2019, as indicated at 2021. The VCR 2014 receives commands from its remote controller 2020. A cable decoder remote control emulator 2022 is connected at 2023 between the VCR 14 and the cable decoder 12. All channel selection codes supplied to the VCR 2014 by its remote controller 2020 are converted by the remote control emulator 2022 to command codes recognized by the cable decoder 2012. The remote control emulator 2022 also suppresses execution of the channel selection codes supplied to the VCR 2014, in order to keep the VCR 2014 tuned to the fixed channel on which the decoded cable signal is supplied.

Figure 24:
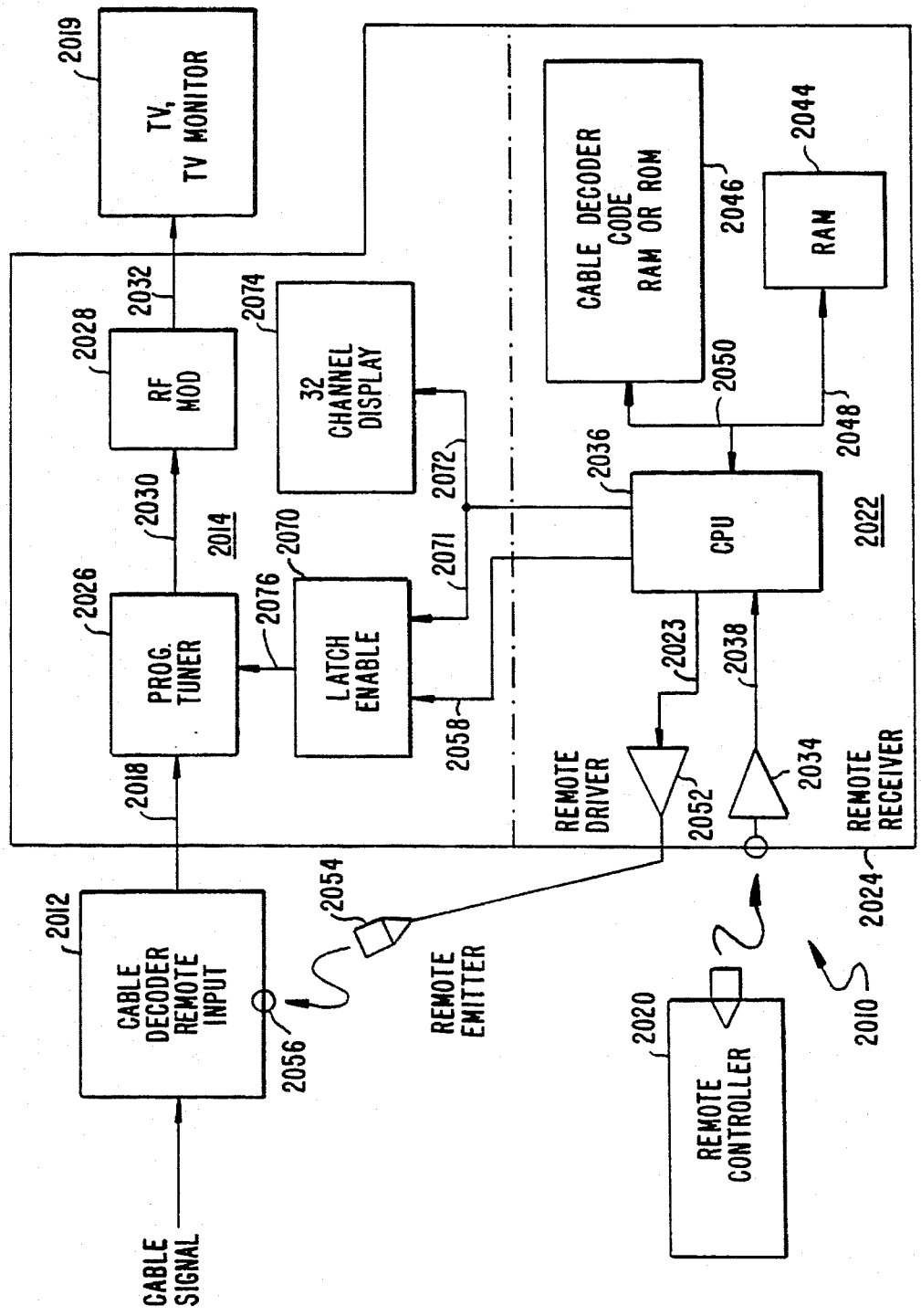
FIG. 24 is a more detailed block diagram of the system shown in FIG. 23.

When the cable decoder mode is selected, channel indicator 2074 (FIG. 24) of the VCR will show the channel selected by the cable decoder unit. There are two reasons for using the VCR 2014 to display the channel number instead of the cable decoder 2012: The cable unit may now be hidden from sight, which is desired by most users, and it provides improved infrared isolation of the VCR remote controller 2020 signal from unwanted pickup by the cable decoder remote input 2056 (FIG. 24). The benefit of using the VCR 2014 for channel display is that the cable decoder unit 2012 can be made transparent to the user.

One aspect of making the cable decoder unit 2012 transparent to the user relates to the time of control of the cable decoder. Just as the schedule system controls the VCR to begin recording at a desired activation time, the cable decoder is also controlled and set to the desired channel at that time. The desired activation time is stored in memory, along with the channel of the selected program, and these stored values are later used to control the cable decoder. The desired activation time is typically the broadcast time of the selected program. It should also be noted that in order to allow for possible inaccuracies in the local system clock time and for variations in the actual broadcast times, the effective broadcast time employed by the schedule system and remote control emulator will typically include a guard time on the order of a few minutes to either end of the scheduled program time period. Controlling the cable decoder at the time of broadcast is critical to making the cable decoder transparent to the user, because if the cable decoder were not controlled at that time, one schedule request could interfere with another schedule request or with a user manual channel selection. This storing in memory of both channels and desired activation times for program selections is performed whether or not the program selections are being entered through an interactive electronic schedule system or are simply being entered manually from a printed television schedule guide.

The remote control emulator 2022 drives an infrared emitter, which is positioned in front of an infrared input on the cable decoder 2012. Thus, the remote control emulator 2022 replaces the conventional cable decoder remote controller. The user communicates with the system using the VCR remote controller 2020. For the user, the system 2010 appears to function in the same manner as would the VCR 2014 connected to the TV 2019 with no cable decoder 2012 present. This means that all functions, including on screen programming and the TV schedule system, provided with the VCR 2014 are fully functional and are operated uniformly by the user and interact with the user uniformly.

Further details of portions of the VCR 2014 and the cable remote emulator 2022 are provided in FIG. 24. As indicated at 2024, the remote emulator 2022 is supplied together with the VCR 2014. The VCR 2014 includes a programmable tuner 2026 connected to an RF modulator 2028 by cable 30. The cable decoder 12 is connected to the programmable tuner 2026 by the cable 2018, and the RF modulator 2028 is connected to the TV 2019 by cable 2032. The remote controller 20 supplies its inputs to a remote receiver 2034 in the cable remote emulator 2022. The remote receiver 2034 is connected to a central processing unit (CPU) 2036 by line 2038. The CPU 2036 is implemented with a commercially available microprocessor integrated circuit, such as those available from Intel Corporation, Santa Clara, Calif., or Motorola, Inc., Phoenix, Ariz. The CPU 2036 is connected to a random access memory 2044 and to cable decoder code memory 2046, which may be either a random access or a read only memory, by busses 2048 and 2050. The CPU 2036 is connected to a remote driver circuit 2052 by the line 2023. The remote driver circuit 2052 is connected to an infrared emitter 2054, which is positioned in front of remote input 2056 of the cable decoder 2012. The CPU 2036 is connected to the programmable tuner 2026 through a latch 2070 by lines 2071 and 2076 and to a channel display 2074 by line 2072. The latch 2070 is also connected to the CPU 2036 by line 2058. The latch 2070 allows the channel data to be shown on the display 2074 to be separated from data which is supplied to the programmable tuner 2026. Data is supplied to the programmable tuner 2026 only when the latch is enabled on line 2058.

In operation, the cable remote emulator 2022 is either programmed to learn the cable decoder 2012 remote controller codes in the conventional manner for teaching a remote controller to learn the commands of a foreign controller, which are then stored in the cable decoder code memory 2046, or the memory 2046 contains conversion codes stored in ROM for the more popular cable decoder 2012 models. The TV schedule system, which also utilizes the CPU 2036, is set to the cable mode by a command from the remote controller 2020. This causes the programmable tuner 2026, also forming part of the TV schedule system, to be non-responsive to the remote controller 2020 channel commands, as a result of a suitable control signal on line 2058, so that the tuner will remain tuned to the fixed channel for the cable decoder 2012, typically channel 3 or 4. However, the channel commands are stored in memory 2044. Whenever the TV schedule system requires channel information, it will refer to the stored channel information. For example, when the TV schedule system is opened, it will point to the channel currently being viewed/recorded. When a program is selected from the TV schedule system, the system will automatically generate codes recognizable by the cable decoder 2012 to change the channel on the cable decoder 2012. When a cable input is not being used, the latch 2070 is enabled on line 2058, so that channel commands on line 2071 are supplied to the programmable tuner 2026.

Remote controller 2020 commands are infrared coupled to the CPU 2036 and stored in memory 2044. When the system 2010 includes a cable decoder 2012, all channel tuning commands from the remote controller 2020 are inhibited in favor of cable decoder channel commands recognized by the cable decoder and produced by the CPU

2036 through conversion from the channel tuning commands. The conversion code is contained in a ROM, or a RAM if the system 2010 has a "learn" mode. After a delay to prevent potential conflict of two infrared signals, the converted code is coupled to the cable decoder remote input 2056 by the infrared emitter 2054. The process of emulating codes recognizable by the cable decoder 2012 is done in a conventional manner known in the art. All other commands from the remote controller 2020 are acted upon in the system 2010 unchanged.

Thus, as discussed above, in one embodiment a system for interfacing a cable television decoder having an input for receiving television signals including a plurality of channels and an output for directing a selected channel from the television signals to a television or television accessory includes a programmable tuning means for selecting a desired television channel signal (connected to the output of the cable television decoder to receive the selected channel on a fixed channel from the cable television decoder), means (connected to the programmable tuning means) for inhibiting the programmable tuning means from tuning to the selected television channel when the cable television decoder is operational, means for emulating the channel selecting commands of the cable television decoder, means (connected to the emulating means) for transmitting emulated channel selecting commands from the emulating means to the cable television decoder, and means (coupled to the emulating means) for making television channel selections. The means for making television channel selections also includes means for setting a desired activation time for a channel selection, and the system includes a memory (connected to the emulating means) for storing television channel selections and desired activation times for the television channel selections.

While the preferred embodiment is directed to controlling the tuner of a cable decoder, the teachings of the present invention are equally applicable to the control of a tuner of a satellite receiver, a telecommunication fiber optic tuner/receiver used to receive TV programming, or any TV tuner apparatus with a tuner that preselects television programs for recording by a VCR. By controlling the preselection TV tuner, the VCR on-screen unattended recording programming functions need not be duplicated by the preselection TV tuner apparatus. Moreover, the viewer is not burdened with the task of programming more than one TV apparatus.

It should now be apparent to those skilled in the art that a novel system for interfacing a cable television decoder to a television accessory capable of achieving the stated objects of the invention has been provided. The system and method provides a single tuning arrangement which will coordinate channel selection information between a cable decoder and a television schedule system, a VCR or any television device. The tuning arrangement is compatible with already installed equipment. The single tuning arrangement eliminates duplicative programming effort and preserves the advanced features of television devices, such as on-screen programming of unattended recording, even when operating behind cable decoders and other TV apparatus with preselection tuners.

III. Background Guide

This aspect of the invention is directed to a convenient background mode for the electronic guide which presents several lines of guide information, typically occupying the bottom quarter of the screen, overlaying the current television program. The background mode enables the viewer to manually or automatically scroll through preselected portions of the schedule information. This preselected information is not just limited to information about a single current (or otherwise selected) program. This background scrolling guide is particularly convenient during a lull in television programming, such as a commercial break. As a supplement to the full-screen foreground guide, the background mode eliminates the need to master the advance navigation commands of the full-screen guides.

Due to the limited amount of listing information that can be displayed in the background guide, preselection of the listing is essential. An indiscriminate scrolling of every listing in a typical one week guide would require 8 hours, even if each listing is scrolled at a rate of one per three seconds. Limiting the listings to a fixed time period, such as the current day, current hour, or primetime is a first step toward implementing a useful background guide. Other selection criteria, such as channel or theme, can be logically combined to further filter the listings down to a total that can be read in a fraction of an hour.

In existing non-interactive scrolling guides available on some cable systems, the listing cannot be controlled by the viewer. Each time the viewer switches the tuner to the guide channel, the listings is at some random point in the one week guide. Listings are grouped chronologically, by day and start time. Under each group are channel identifiers arranged numerically or by cable source name if it is a listing for cable-TV programming. Without user interaction, there is little chance that the viewer will randomly tune to the guide channel and see desired listings at the desired time and channels without a tedious wait. For an interactive background guide, the ability to resume and continue forward from the last listing is highly desirable.

Figure 25:
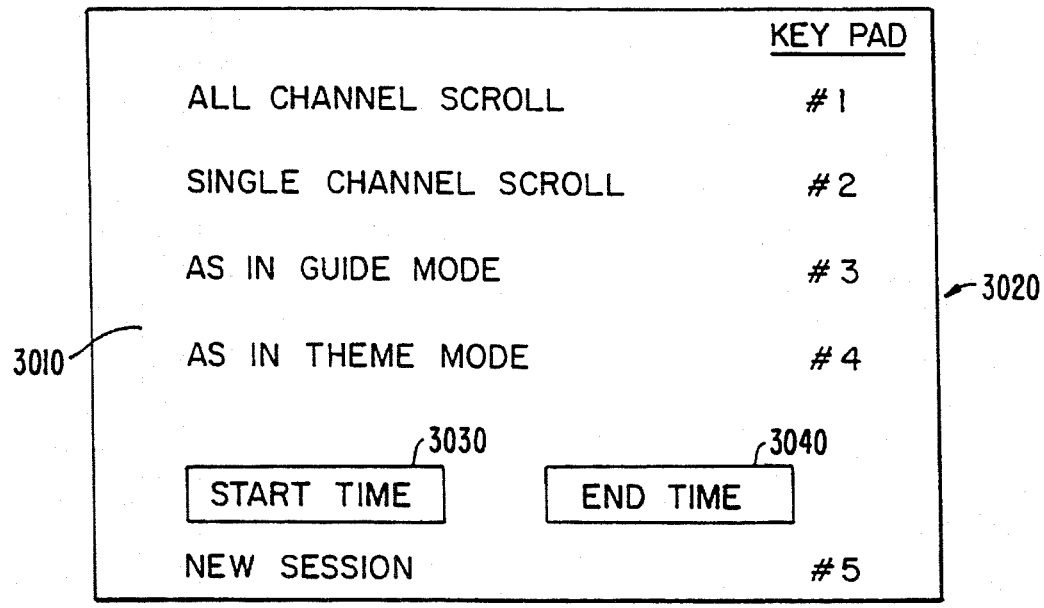
FIG. 25 shows a setup screen for a background guide according to one aspect of the present invention.

In the present invention, there is a concept of a guide session which allows the user to open the background guide repeatedly, interleaved with non-background guide activities, such as watching TV or using the foreground guide. During a session, specific setup criteria for the background is persistent and stored in electronic memory. This may include the time-period over which the listings are scrolled, whether the scrolling is manual or automatic, the channel of the last listing, whether sorting by theme has been setup, whether sorting by favorite channels has been setup. One or all criterion may be manually changed without terminating a session. Some criteria may be automatically changed if the cursor or setup of the foreground guide is changed. A session is completed if the background guide has not been accessed for a certain period of time, or the user manually selects a new session. A typical setup screen for the background schedule guide is shown in FIG. 25, in which setup screen 3010 occupies all of television screen 3020.

Figure 26A:
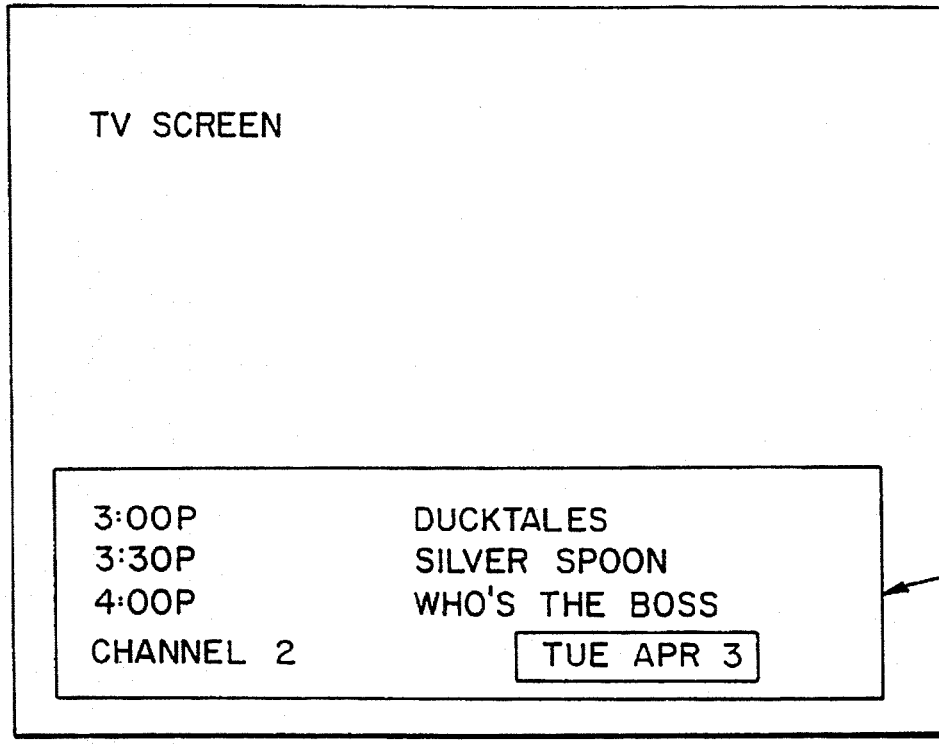
FIGS. 26a and 26b show background guide presentations according to one aspect of the present invention.
Figure 26B:
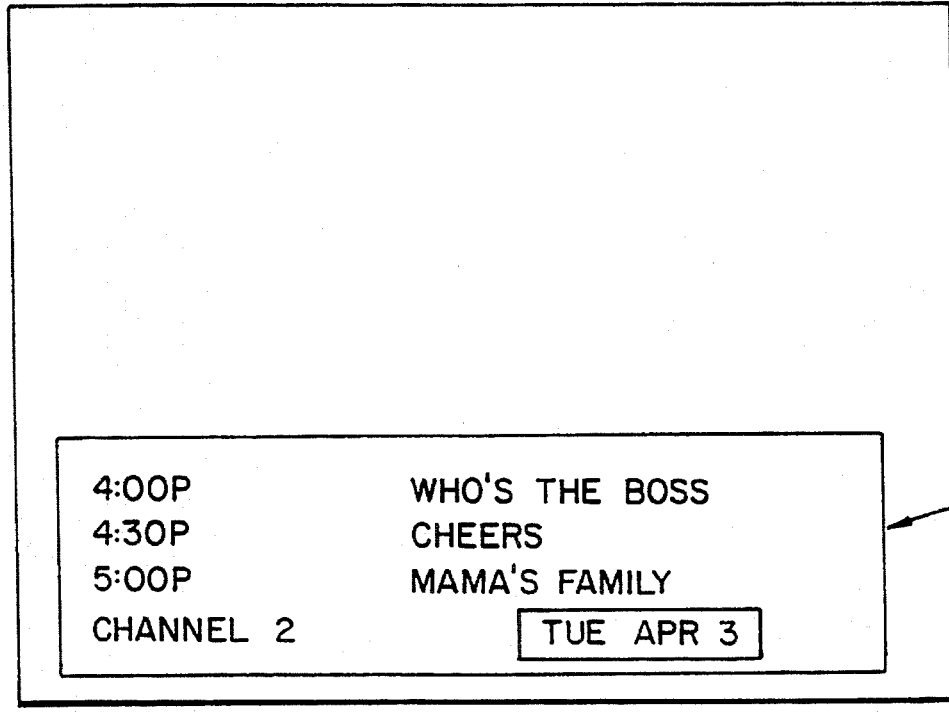

During a session, each time the viewer opens the background guide, the initial listing will continue from (or repeat) the last listing displayed in the previous background guide access. The pointer to the current listing within a set of schedule information is known as a tab. The tab can be advanced by manual or automatic scrolling. Additionally, if the current system clock time catches up to a tab in a time-indexed set of schedule information, the tab will be pushed forward from then on in step with the system clock until overridden by a user. A session does not end when scrolled to the end of the time period window, but repeats itself when all listings in a time-period have been scrolled. By providing persistent storage of the last time-period, the last listing, or tab, within the time period, the last channel, and the setup criteria for the foreground guide, the viewer is freed from the chore of remembering and reentering a host of background setup criteria each time the background guide is opened. This is illustrated in FIGS. 26*a* and 26*b*. FIG. 26*a* shows the display of a background guide 3110. If at three o'clock the user suspends the background guide for an hour, and then reactivates it within the same session, the display upon reactivation would be as shown in FIG. 26b. Backround guide display 3120 of FIG. 26b is determined by the same stored operating characteristics such as theme, time period, manually scrolling, automatically scrolling, etc., as were used for the display of FIG. 26a. Note that the tab, or the pointer to the current listing, has been pushed forward from three o'clock to four o'clock by the advancing time on the system clock. The status of displays 3110 and 3120 are substantially the same, except that the passage of time causes the displayed schedule information to only partially overlap.

In the preferred implementation, pressing the background guide command once will start display of a background guide. It will list programs according to During a session, each time the viewer opens the background guide, the initial listing will continue from (or repeat) the last listing displayed in the previous background guide access. The pointer to the current listing within a set of schedule information is known as a tab. The tab can be advanced by manual or automatic scrolling. Additionally, if the current system clock time catches up to a tab in a time-indexed set of schedule information, the tab can be pushed forward from then on in step with the system clock until overridden by a user. The tab is pushed forward as broadcasts end. If the system clock surpasses the tab, once all programs at the tab time setting are over, the tab setting will be advanced.

The default setting for the tab when the guide is first opened is the earliest start time of any program that is still being broadcast at the time the guide is opened. The tab is then advanced, and listings printed, repeatedly, until the guide screen space is filled. From that point on the tab can be advanced by either manual scrolling or automatic scrolling. Automatic scrolling can be at a fixed number of listings per time period, or can simply be from the tab being pushed forward by program broadcasts ending, as described above.

A session does not end when scrolled to the end of the time period window, but repeats itself when all listings in a time-period have been scrolled. By providing persistent storage of the last time-period, the last listing, or tab, within the time period, the last channel, and the setup criteria for the foreground guide, the viewer is freed from the chore of remembering and reentering a host of background setup criteria each time the background guide is opened. This is illustrated in FIGS. 26a and 26b. FIG. 26a shows the display of a background guide 3110. If at three o'clock the user suspends the background guide for an hour, and then reactivates it within the same session, the display upon reactivation would be as shown in FIG. 26b. Backround guide display 3120 of FIG. 26b is determined by the same stored operating characteristics such as theme, time period, manually scrolling, automatically scrolling, etc., as were used for the display of FIG. 26a. Note that the tab, or the pointer to the current listing, has been pushed forward from three o'clock to four o'clock by the advancing time on the system clock. The status of displays 3110 and 3120 are substantially the same, except that the passage of time causes the displayed schedule information to only partially overlap.

In the preferred implementation, pressing the background guide command once will start display of a background guide. It will list programs according to previous criteria selected by the setup menus for the background guide and the foreground guide. Depending on the prior setup, the background guide may automatically scroll, or may be manually stepped using the Page Up/Dn keys. The channel of the background listings may be sequenced by pressing the Channel Up/Dn key. Depending on the background mode selected, pressing a Channel key will cause the listing to jump to the next channel that is defined either by the Channel Up/Dn keys, or according to the sequence defined under the foreground guide. Pressing the TV, Guide, or Theme key will terminate the background guide display, but not the session.

To change the mode of the background guide, the background guide command is entered again while a background guide is displayed. A background guide setup menu will be displayed displacing the background listings. One such setup screen 3010 is shown in FIG. 25, in which setup screen 3010 is shown to cover the entire television screen 3020. In alternative embodiments, the setup screen occupies only the same portion of the television screen as the background guide. From the setup menu, the viewer may select another background mode:

Scroll current listings for all channels. This is the default mode when a new session is started.

Scroll listings for current channel,

Scroll listings according to the selection criteria when the foreground guide mode was last exited, Scroll according to the theme criteria when the theme guide was last exited.

The setup menu also allows the viewer to change the time period from the default period. The default time period is the current time to programs starting in the next 3 hours. The time period is shown by start time block 3030 and end time block 3040. At the end of the time-period, the listing will loop back to the start of the time-period. If there is a Primetime command, actuating this command will cause the time-period to be automatically set to the designated primetime. The viewer can also select a new session, in which all the default selections (including the default time-period) will be reinstated.

The following is a detailed description of each mode:

1) All selected channel scroll. This is the default mode when a new session is started. The first listing of the background guide is for the program on the current tuner channel. Pressing the page up/down key momentarily will manually advance the listings starting with the listing group for the current time. When all channels with the current start time is displayed, the next group of listings for the next start time will be displayed. Pressing the page key for 3 seconds, or longer, will start automatic scrolling of the guide. The guide will scroll through all channels which have been declared favorites in the foreground grid guide. If the favorite channel menu has not been setup, by default, all channels will be considered favorites. Typically, all channels listed in the opening few pages of the grid guide are favorite channels.

a) Pressing a channel key will cause the listing to jump to the next channel listed in the grid guide. The Up channel key will cause listing to advance to the next higher listed channel, and to the previous listed channel for the Down channel key. Pressing the page key momentarily will cause scrolling to stop. The next page key command will resume manual scrolling of the background guide.

b) Pressing the primetime command will change the time-period to match the primetime period. The latter has a default time of 7 PM to 11 PM, but may be defined by the user when setting up the foreground guide.

c) The viewer can immediately change tuner channel to one that is displayed in the background guide by pressing the Enter key. The background mode is not exited, and the viewer may continue scrolling the background guide.

d) To exit, press TV or any other mode command.

e) To resume the background mode last selected, press the background guide key. If the session is not over, the guide will continue from the last listing displayed.

While a background guide is displayed, pressing the background guide command key will toggle presentation of the setup menu. Another mode can be selected without ending the current session. For example, a single channel mode can be selected and scrolled over the current time-period. Pressing the background guide command again will toggle back to TV viewing with a background guide.

2) Single channel scroll. This mode may be selected by pointing to the Single Channel mode in the setup menu, or by entering the number #2 key. The single channel background guide is almost identical to the single channel foreground guide, except that only one or two programs is displayed.

a) Pressing the page up/down command will manually display listing for the selected channel. If the page key is held down for three seconds, or longer, the guide will scroll at a predetermined rate automatically in the direction of the selected channel key (up or down). To return to manual scrolling, press the page key momentarily and release.

b) Pressing either the up/down channel key will cause the listing to jump to the listing for the next channel.

c) The viewer can immediately change tuner channel to one that is displayed in the background guide by pressing the Enter key. The background mode is not exited, and the viewer may continue scrolling the background guide.

d) To exit, press TV or any other mode command.

e) Press the background guide command to resume listing. If a new session is not started, the first displayed listing will continue from the last listing scrolled before exiting the background mode.

Pressing the background command will open the setup menu. A different time-period can be selected if desired. Alternatively, the user can select New Session, to reset to the default time-period. Or the viewer can select another background mode. After the setup menu selection is completed, pressing the background guide command guide will restart display of the background guide.

3) Scroll according to the criteria setup for the guide. This background mode preselects display listing according to the guide mode that was last active. It can be the grid guide, or the theme guide. This mode provides an alternative way of viewing the listings normally seen on the grid guide or the theme guide, whichever was last viewed. Specifically, the start time is indicated by the leading edge of the grid guide cursor. The default time-period is 3 hours. This background guide will scroll through the listings of channels that are defined in the grid guide.

A typical application for this mode is as follows: assume that the viewer has started browsing the grid guide and decides to return to TV viewing. During the next commercial break, the viewer can open the background guide to resume displaying listings of programs starting at the cursor position in the grid guide. This eliminates the need to specify favorite channels in the background guide duplicating the setup effort of the grid guide. Likewise, if the viewer was browsing the theme guide, the background guide will resume listings of programs at the cursor position in the theme guide. This eliminates the need for the reviewer to setup theme and subtheme criteria in the background mode.

a) Pressing the Enter key will cause the tuner channel to change immediately to the listed channel in the background guide.

b) Pressing the page key will manually advance the listings. Momentarily holding the page key down for several seconds will cause the display to automatically scroll. Pressing any page key again will cause the scrolling to stop and to resume manual advancing of the listings.

c) To exit, press TV or any other mode command.

Channel presentation on the grid guide.

It is desirable to list programs in the order of most favorite channels instead of sequentially by channel number or alphabetically as in a printed television guide. A channel menu is provided to allow the viewer to arrange channel listings in the preferred order. In this way, the most favorite channels will be grouped together, on one or two pages, greatly reducing the need to perform channel paging. This is usually a one-time installation menu that allows the user to define channels that are favorites, and to be listed in the grid guide in a preferred order.

The channel select menu provides a list of all channels that can be received by a viewer. From this list, channels can be designated as favorites. Favorite channels are automatically given certain priorities. For example, in the event that the schedule memory is insufficient to store all the listing information downloaded from broadcast, program notes and other descriptive information for non-favorite channels will be discarded before discarding such information for favorite channels. In case of severe shortage of memory space, listings for non-favorite channels will be discarded first.

The channel select menu also allows the viewer to decide on the listing priority of favorite channels on the grid guide. In one implementation, the channel select menu is a list of all channels, arranged in columns. The first column on the left, from top to bottom, will be the order in which channel listings will appear in the grid guide. Once favorite channels are designated, they will automatically be grouped together in the left-most columns. For example, if there are four favorite channels, such as CNN, DISN, HBO and SHO, it is possible to position SHO as the first channel in the grid guide. To do this, highlight the location where the new channel is to be moved. In this case, CNN is first highlighted. Next select the preferred channel, SHO. When this is done, CNN, DISN, and HBO will shift down one slot, and SHO will be entered into the first slot.

The channel select menu is maintained in a persistent (a non-volatile) memory and is used by foreground and background guides and serves as user input selection criteria when listing program in the grid guide, or to determine the order and which channels are to be listed in the background guide.

It should further be apparent to those skilled in the art that various changes in form and details of the invention as shown and described may be made. It is intended that such changes be included within the spirit and scope of the claims appended hereto.

What is claimed is:

1. A background television schedule system for displaying television schedule information on a television including a television screen on which is displayed a primary display, the background television schedule system comprising:

set-up display controller, coupled to said television, for assisting a user in selecting a television program listing arrangement, and for displaying on said television user selections of said television program listing arrangement;

a memory, coupled to said television, for storing said user selections;

activation controller, coupled to said memory, for activating and suspending operation of said background television schedule system; and background display controller, coupled to said television and to said memory, for displaying background schedule information over a portion of said television screen in response to an activation of operation of said background television schedule system, said primary television display being displayed on said television screen in conjunction with said background schedule information, said displayed background schedule information being determined according to said user selections.

2. The background television schedule system of claim 1, wherein said set-up display controller comprises means for displaying said television program listing arrangement over a portion of said television screen in response to said user selections, said primary television display being displayed on said television screen in conjunction with said television program listing arrangement.

3. The background television schedule system of claim 1, further comprising a system clock, wherein said background display controller comprises means for automatically defining a time period for coverage by said background schedule information according to said system clock and a predetermined span of time, and means for defining a time period for coverage by said background schedule information in response to user inputs.

4. The background television schedule system of claim 1, wherein said memory is further for storing at lease one preferred television channel, and wherein said preferred television channels are defined by user inputs, and wherein said preferred television channels are displayed in said background schedule information.

5. The background television schedule system of claim 4, further comprising scrolling means for scrolling preferred television channels in said displayed background schedule information, wherein said scrolling means scrolls said preferred television channels in response to user inputs, and wherein said scrolling means automatically scrolls said preferred television channels after predetermined intervals of time.

6. The background television schedule system of claim 4, further comprising means for arranging said preferred television channels in a desired order in response to user inputs.

7. A background television schedule system for displaying television schedule information on a television, said background television schedule system comprising:

a set-up display controller, coupled to said television, for assisting a user in selecting a television program listing arrangement, and for displaying on said television user selections of said television program listing arrangement;

a memory, coupled to said television, for storing said user selections;

a CPU, coupled to said memory, for activating and suspending operation of said background television schedule system; and a background display controller, coupled to said television and to said memory, for displaying background schedule information on said television in response to an activation of operation of said background television schedule system, said displayed background schedule information being determined according to said user selections.

* * * * *